United States Patent
Zolotorev et al.

(10) Patent No.: US 6,859,795 B1
(45) Date of Patent: Feb. 22, 2005

(54) METHOD FOR CARRYING OUT TRANSACTIONS AND DEVICE FOR REALIZING THE SAME

(75) Inventors: Oleg Anatolivich Zolotorev, Leningradskaya oblast (RU); Ivan Vladimirovich Kuznetsov, Saint-Petersburg (RU); Andrey Gennadievich Moshokin, Saint-Petersburg (RU); Alexandr Leonidovich Smirnov, Saint-Petersburg (RU); Ildar Magafurovich Khamitov, Saint-Petersburg (RU)

(73) Assignee: Cyphermint, Inc., Marlborough, MA (US)

( * ) Notice: Subject to any disclaimer, the term of this patent is extended or adjusted under 35 U.S.C. 154(b) by 0 days.

(21) Appl. No.: 09/445,386

(22) PCT Filed: Jul. 29, 1999

(86) PCT No.: PCT/RU99/00264
§ 371 (c)(1),
(2), (4) Date: Dec. 6, 1999

(87) PCT Pub. No.: WO00/31700
PCT Pub. Date: Jun. 2, 2000

(30) Foreign Application Priority Data

Nov. 25, 1998 (RU) .......................................... 98120922

(51) Int. Cl.[7] .............................. H04L 9/00; G06F 17/60
(52) U.S. Cl. ............................. 705/77; 705/64; 705/67; 705/76; 380/24; 380/25; 380/28
(58) Field of Search .............................. 705/74, 75, 77

(56) References Cited

U.S. PATENT DOCUMENTS

| 4,206,315 A | 6/1980 | Matyas et al. |
| 4,264,782 A | 4/1981 | Konheim |
| 4,309,569 A | 1/1982 | Merkle |
| 4,386,233 A | 5/1983 | Smid et al. |
| 4,393,269 A | 7/1983 | Konheim et al. |
| 4,405,829 A | 9/1983 | Rivest et al. |
| 4,625,076 A | 11/1986 | Okamoto et al. |
| 4,759,063 A | 7/1988 | Chaum |
| 4,759,064 A | 7/1988 | Chaum |
| 4,881,264 A | 11/1989 | Merkle |

(List continued on next page.)

FOREIGN PATENT DOCUMENTS

JP       407302288 A  * 11/1995  ........... G06E/19/00

OTHER PUBLICATIONS

In memory of Money/Bers, Joanna Smith/Bank systems and Technology, v32n9, pp. 42–46, Sep. 1995.*

(List continued on next page.)

*Primary Examiner*—James P. Trammell
*Assistant Examiner*—Daniel L. Greene
(74) *Attorney, Agent, or Firm*—Myron Greenspan, Esq.; Lackenbach Siegel LLP

(57) ABSTRACT

A method for effecting payments is suggested which allows protecting the financial interests of each participant of a payment during payments via open telecommunication nets from other participants' cheating, provides protection of the payers' and payees' privacy, admits payments ranging from micro-payments to business-to-business payments, ensures that the time taken to effecting a payment depends only on the speed of action of the net connections and not on the payment amount, makes it possible to serve of serving a number of clients which grows proportionally to the payment system operators resources, is easy to build into an arbitrary trade system, enables each client both to pay and to receive payments, and makes possible payments between clients of different banks. The method of effecting payments is realized with the help of programming means.

109 Claims, 2 Drawing Sheets

U.S. PATENT DOCUMENTS

| | | |
|---|---|---|
| 4,893,338 A | 1/1990 | Pastor |
| 4,914,698 A | 4/1990 | Chaum |
| 4,926,479 A | 5/1990 | Goldwasser |
| 4,926,480 A | 5/1990 | Chaum |
| 4,933,970 A | 6/1990 | Shamir |
| 4,944,007 A | 7/1990 | Austin |
| 4,947,430 A | 8/1990 | Chaum |
| 4,949,380 A | 8/1990 | Chaum |
| 4,969,189 A | 11/1990 | Ohta et al. |
| 4,977,595 A | 12/1990 | Ohta et al. |
| 4,987,593 A * | 1/1991 | Chaum ........................ 705/69 |
| 4,991,210 A | 2/1991 | Chaum |
| 4,995,082 A | 2/1991 | Schnorr |
| 4,996,711 A | 2/1991 | Chaum |
| 5,005,200 A | 4/1991 | Fischer |
| 5,016,274 A | 5/1991 | Micali et al. |
| 5,020,105 A | 5/1991 | Rosen et al. |
| 5,131,039 A | 7/1992 | Chaum |
| 5,140,634 A | 8/1992 | Guillou et al. |
| 5,214,702 A | 5/1993 | Fischer |
| 5,224,162 A | 6/1993 | Okamoto et al. |
| 5,226,079 A | 7/1993 | Holloway |
| 5,231,666 A | 7/1993 | Matyas |
| 5,245,657 A | 9/1993 | Sakurai |
| 5,276,736 A | 1/1994 | Chaum |
| 5,295,188 A | 3/1994 | Wilson et al. |
| 5,297,202 A | 3/1994 | Kapp et al. |
| 5,297,206 A | 3/1994 | Orton |
| 5,299,262 A | 3/1994 | Brickell et al. |
| 5,315,658 A | 5/1994 | Micali |
| 5,373,558 A | 12/1994 | Chaum |
| 5,420,926 A | 5/1995 | Low et al. |
| 5,434,919 A | 7/1995 | Chaum |
| 5,442,707 A | 8/1995 | Miyaji et al. |
| 5,446,796 A | 8/1995 | Ishiguro et al. |
| 5,448,639 A | 9/1995 | Arazi |
| 5,453,601 A | 9/1995 | Rosen |
| 5,475,763 A | 12/1995 | Kaufman et al. |
| 5,485,520 A | 1/1996 | Chaum et al. |
| 5,493,614 A | 2/1996 | Chaum |
| 5,502,764 A | 3/1996 | Naccache |
| 5,511,121 A | 4/1996 | Yacobi |
| 5,521,980 A * | 5/1996 | Brands ........................ 380/30 |
| 5,537,475 A | 7/1996 | Micali |
| 5,553,145 A | 9/1996 | Micali |
| 5,564,106 A | 10/1996 | Puhl et al. |
| 5,577,124 A | 11/1996 | Anshel et al. |
| 5,581,615 A | 12/1996 | Stern |
| 5,588,061 A | 12/1996 | Ganesan et al. |
| 5,590,197 A | 12/1996 | Chen et al. |
| 5,604,805 A | 2/1997 | Brands |
| 5,606,617 A | 2/1997 | Brands |
| 5,610,982 A | 3/1997 | Micali |
| 5,615,269 A | 3/1997 | Micali |
| 5,625,692 A | 4/1997 | Herzberg et al. |
| 5,625,695 A | 4/1997 | M'Raihi et al. |
| 5,627,893 A | 5/1997 | Demytko |
| 5,629,982 A | 5/1997 | Micali |
| 5,633,929 A | 5/1997 | Kaliski, Jr. |
| 5,638,445 A | 6/1997 | Spelman et al. |
| 5,638,447 A | 6/1997 | Micali |
| 5,642,419 A | 6/1997 | Rosen |
| 5,659,616 A | 8/1997 | Sudia |
| 5,666,420 A | 9/1997 | Micali |
| 5,668,878 A | 9/1997 | Brands |
| 5,671,285 A | 9/1997 | Newman |
| 5,677,955 A | 10/1997 | Doggett et al. |
| 5,689,567 A | 11/1997 | Miyauchi |
| 5,696,827 A | 12/1997 | Brands |
| 5,708,714 A | 1/1998 | Lopez |
| 5,712,913 A | 1/1998 | Chaum |
| 5,715,314 A | 2/1998 | Payne et al. |
| 5,719,940 A | 2/1998 | Ahn et al. |
| 5,734,901 A | 3/1998 | Sidhu et al. |
| 5,754,654 A | 5/1998 | Hiroya et al. |
| 5,761,311 A | 6/1998 | Spelman et al. |
| 5,764,768 A | 6/1998 | Spelman et al. |
| 5,768,385 A | 6/1998 | Simon |
| 5,768,388 A | 6/1998 | Goldwasser et al. |
| 5,781,631 A | 7/1998 | Chaum |
| 5,790,667 A | 8/1998 | Omori et al. |
| 5,790,675 A | 8/1998 | Patarin |
| 5,790,677 A | 8/1998 | Fox et al. |
| 5,799,086 A | 8/1998 | Sudia |
| 5,799,087 A | 8/1998 | Rosen |
| 5,805,702 A | 9/1998 | Curry et al. |
| 5,806,063 A | 9/1998 | Dickens |
| 5,812,670 A | 9/1998 | Micali |
| 5,825,880 A | 10/1998 | Sudia et al. |
| 5,825,884 A | 10/1998 | Zdepski et al. |
| 5,832,089 A | 11/1998 | Kravitz et al. |
| 5,832,090 A | 11/1998 | Raspotnik |
| 5,848,161 A | 12/1998 | Luneau et al. |
| 5,862,223 A | 1/1999 | Walker et al. |
| 5,862,325 A | 1/1999 | Reed et al. |
| 5,867,494 A | 2/1999 | Krishnaswamy et al. |
| 5,867,578 A | 2/1999 | Brickell et al. |
| 5,870,473 A | 2/1999 | Boesch et al. |
| 5,870,476 A | 2/1999 | Fischer |
| 5,872,844 A | 2/1999 | Yacobi |
| 5,874,954 A | 2/1999 | Kilmer et al. |
| 5,878,138 A | 3/1999 | Yacobi |
| 5,878,140 A | 3/1999 | Chaum |
| 5,878,141 A | 3/1999 | Daly et al. |
| 5,878,143 A | 3/1999 | Moore |
| 5,884,270 A | 3/1999 | Walker et al. |
| 5,884,272 A | 3/1999 | Walker et al. |
| 5,889,862 A | 3/1999 | Ohta et al. |
| 5,889,863 A | 3/1999 | Weber |
| 5,897,663 A | 4/1999 | Stancil |
| 5,898,154 A | 4/1999 | Rosen |
| 5,901,229 A | 5/1999 | Fujisaki et al. |
| 5,903,880 A | 5/1999 | Biffar |
| 5,903,895 A | 5/1999 | Hoffman et al. |
| 5,905,976 A | 5/1999 | Mjolsnes et al. |
| 5,909,492 A | 6/1999 | Payne et al. |
| 5,910,989 A | 6/1999 | Naccache |
| 5,915,022 A | 6/1999 | Robinson et al. |
| 5,920,629 A | 7/1999 | Rosen |
| 5,926,548 A | 7/1999 | Okamoto |
| 5,982,506 A | 11/1999 | Kara |
| 5,983,207 A | 11/1999 | Turk et al. |
| 5,999,625 A | 12/1999 | Bellare et al. |
| 6,003,028 A | 12/1999 | Koenig |
| 6,072,870 A * | 6/2000 | Nguyen et al. ............... 705/79 |

OTHER PUBLICATIONS

David Chaum, "Blind Signatures for Untraceable Payments," in *Advanced Cryptology: Proceedings of the Crypto 82*, 1983, pp199–203.

David, Chaum, "Security Without Identification: Transaction Systems to Make Big Brother Obsolete," in *Communications of the ACM*, vo. 28, No. 10, Oct. 1985.

D. Pointcheval and J. Stern, "Provably Secure Blind Signature Schemes," *Lecture notes in Comp. Sci.*, 1163, 1996, pop. 252–65.

A.J. Menez, P.C. Van Oorshot, and S.A. Vanstonre, *Handbook of Applied Cryptography*, CRC Press, 1997, pp. 8, 145, 185, 285, 321, 348, 433.

Jon M. Peha and Kharnitov, Pay Cash: A secure Efficient Internet Payment System, Accepted for Publication in *Proc. Of Fifth International Conference on Electronic Commerce*, Oct. 2003, pp. 1–10.

* cited by examiner

METHOD FOR CARRYING OUT TRANSACTIONS AND DEVICE FOR REALIZING THE SAME

PRIORITY CLAIM

The present application claims priority from PCT/RU99/00264 filed Jul. 29, 1999, which claims priority from Russian Application No. 98120922 filed Nov. 25, 1998.

BACKGROUND OF THE INVENTION

1. Field of the Invention

The invention relates to electronic payment systems.

2. Description of the Related Art

Electronic payment systems are intended to provide an adequate payment means for effecting transactions via open communication nets. Besides the degree of security and reliability, the cost of servicing, the rapidity of performing main operations, etc., an important characteristic of a payment system is the protection of user's privacy. A user's privacy implies that nobody, not even the payment system operator, can control the user's purchases. One of the ways of protecting privacy in electronic payment systems consists in that purchases are made with the help of digital data, which confirm the solvency, but do not lead to the identification of the payer. Such data are sometimes called electronic cash. However, electronic cash, as well as any digital data, can easily be copied, so that one must take care to prevent multiple spending of electronic cash.

In certain payment systems, multiple spending is prevented by payer devices (S. Brands, Untraceable Off-Line Cash in Wallets with Observers, Advances in Cryptology CRYPTO '93, Springer-Verlag, pp. 302–318). For reliable prevention of multiple spending, such payer devices must be tamper-resistant, i.e., they must prevent unauthorized access to the data contained in the payer device. The deficiency of systems using this approach is that they are extremely unstable. The matter is that penetration into one payer device can lead to disastrous effects for the entire system, because the data contained in the payer device allow one to spend arbitrary amounts of unpaid electronic cash. Known tamper resistance technologies are not sufficiently dependable to thwart such a risk.

Electronic payment systems which do not rely on tamper resistance of payer devices must ensure, in particular, that one cannot forge payment certificates, i.e., digital data confirming the payer's solvency. The forgery is prevented by cryptographic methods, namely, by the payment system operator's digital signature. Numerous examples of digital signature are described in the books: B. Schneier, Applied Cryptography: Protocols, Algorithms, and Source Code in C, John Wiley&Sons, New York, 2nd edition, 1996 and A. J. Menezes, P. C. Van Oorshot, S. A. Vanstone, Handbook of Applied Cryptography, CRC Press, 1997.

Electronic payment systems in which the impossibility of forgery of payment certificates is ensured by the payment system operator's digital signature can be classified into offline and online ones. In offline payment systems, the moment of receiving the money by a payee is the moment of successful verification by the payee of the payment certificates provided by the payer as a payment. An advantage of such systems is that the transfer of money from payers to payees can be performed without any third party. Here, to prevent the multiple spending of payment certificates, the payer's identifier is included in payment certificates in a concealed form, and the identifier of the payer having committed multiple spending can be disclosed. The deficiency of this method is that it does not prevent the multiple spending of payment certificates, and only allows one to detect such a spending and to make a certain payer responsible for it. Thus, if the cheater is out of reach, then the payment system operator will incur losses. In addition, an honest payer's reputation can suffer if a cheater has gained information on his payment certificates and used such a certificate. Several offline payment systems are known. For example, a system of such type is described in the patent: T. Okamoto, K. Ohta, Electronic cash system, U.S. Pat. No. 5,224,162, 8 Jun. 1992.

In an online payment system, the payee turns to the payment system operator for verification of each payment. In this case, to prevent multiple spending the payment system operator stores information on the payment certificates used earlier, and if a payment is performed with the help of a certain payment certificate, the operator checks whether the certificate has already been used before.

Known in the prior art is a method for effecting payments (Untraceable electronic cash, U.S. Pat. No. 5,768,385, 16 Jun. 1998) in which the payer receives in the bank digital signatures of payment certificates, called electronic coins, which he can use both for exchange for new electronic coins, and for payment. Here, the bank does not know which one of the two modes is used by the payer, which fact promotes untraceability of payments. Further, the multiple spending of electronic coins is prevented by the payee's online verification of the received electronic coins in the bank. However, the known method does not provide complete untraceability of a participant of the system if he is mostly a payer and not a payee, because the electronic coins given to such a participant and produced by the shop for exchange are evidence, generally speaking, that the participant made a payment to the shop.

Known in the prior art is a method for effecting payments (D. Chaum, Security Without Identification: Transaction Systems to Make Big Brother Obsolete, Communications of the ACM, vol. 28 no. 10, October 1985 p. 1035–1038) which is the closest analog of the present invention and is chosen by the applicant as the prototype. In the known method, a client pays with payment certificates, called electronic coins, whose signatures he receives in the bank. Here, the collection of possible nominal values is fixed in advance, and for each possible nominal value of an electronic coin the bank creates a secret and a public money key. To obtain an electronic coin the payer chooses the number of the coin with the help of a random number generator, obtains the blind digital signature on the chosen number in the bank willing to credit the payer with the corresponding amount of money, and takes said digital signature as the signature of the payment certificate, which can also be called the payment certificate signature. During the payment, the payer transfers to the payee a collection of electronic coins, after which the payee verifies their validity and sends the received coins to the bank for depositing to his account. The bank verifies the validity of the electronic coins and credits the payee's account with the corresponding amount if the coins have not been already used. To control the coins already used, the bank stores the list of the numbers of used coins, the expiration dates contained in the numbers of the coins allowing the bank to delete old numbers from the list. The deficiencies of the known method are in that the bank's reputation is not defended against dishonest clients, and a client's money is not defended against a dishonest bank, because a dishonest client having received the bank's refusal to acknowledge an already used certificate for the second time can accuse the bank of cheating. In turn, a dishonest bank having received a certificate for verification may claim that the certificate has already been used before. In addition, the bank has to store information on each of the used certificates in databases with sufficiently fast access, which leads to a rapid growth of the bank's databases and to the necessity of employing expiration dates for certificates. Furthermore, in the known method the payment amount is an integral combination of nominal values of coins, which fact either limits the range of payments, or leads to the growth of the number of the coins used in payments, which also leads to the growth of the bank's databases and slows down the payments.

Known in the prior art is an apparatus for effecting payments (T. Okamoto, K. Ohta, Method and apparatus for implementing electronic cash, U.S. Pat. No. 4,977,595, 11 December 1990), chosen by the applicant as the prototype.

The known apparatus for effecting payments consists of a payer device, a shop, and a bank, connected via telecommunication nets, the payer device having a means for replenishing the payer device by obtaining the blind money signature of the bank, and the bank having a means for producing the money signature. In addition, the shop contains a means for offline verification of payment certificates, and the bank contains means for exposure of a cheater if he multiple-spends the bank's obligation.

The deficiency of the known apparatus for effecting payments is that it does not prevent the multiple spending of payment certificates, and only allows one to detect such a spending and to make a certain payer responsible for it. Another deficiency of the known apparatus for effecting payments is that it works slowly, which is caused by the large size of the data transmitted via communication nets.

SUMMARY OF THE INVENTION

The main problem solved by the variants of the claimed invention is to create methods for effecting payments which would ensure an effective and reliable mechanism of paying via open communication nets, protection of each participant of the payment system from the other participants' cheating, privacy protection for ordinary participants of payments, and a wide range of payments.

The technical result common to all suggested variants of the claimed method for effecting payments is that when effecting payments via open telecommunication nets the financial interests of each participant are protected against the other participants' cheating, and payers and payees are able to protect their privacy. Furthermore, in some of the claimed variants, payments ranging from micro-payments to business-to-business payments are available, the time taken to effect a payment depends only on the speed of action of the net connections, and not on the payment amount, and the number of the clients that can be served by the payment system operator grows proportionally to the operator's resources. The method for effecting payments is realized by an apparatus for effecting payments implemented by programming means.

An essential distinction between the claimed invention and the prior art is that not only the privacy of the participants of a payment operation is protected, but also the payer's financial interests are ensured, since the payment is effected on the basis of a payer order signed with the secret key connected with a payment certificate. Furthermore, in some of the claimed variants, it is allowed to spend payment certificates gradually and to replenish them.

The payer's privacy is protected by the procedure of making a blind signature on a payment certificate, and the payee's privacy can be protected when opening an account the payee does not have to give information, identifying him. In those variants where the payment system operator controls the conditions of payment and, in particular, information about the payment objective, the payer's and the payee's privacy is protected by that such a control is performed without access to the confidential part of the conditions of payment.

The claimed method for effecting payments is intended exclusively for hardware or computer realization, because the processing of the data used in effecting of payments, and, in particular, making and verification of digital signatures practically admits only hardware or computer realization.

The description of the method for effecting payments and the apparatus therefore as presented below is intended to describe the invention, and should not be taken to limit the scope of the claimed invention, which is described more fully elsewhere in the present specification.

Information specifying the terminology used in the present application is given below.

When effecting payments involving digital signatures, as in any system using digital signatures, one deals with data which are stored on suitable material media and admit digital representation (B. Schneier, Applied Cryptography: Protocols, Algorithms, and Source Code in C, John Wiley & Sons, New York, 2nd edition, 1996 and A. J. Menezes, P. C. Van Oorshot, S. A. Vanstone, Handbook of Applied Cryptography, CRC Press, 1997).

In some of digital signature schemes, it is easy to make a digital signature on random data without access to the secret keys. In order to exclude the possibility of avoid obtaining a digital signature without assistance of the holder of the secret key, one singles out among all data a set of valid data, and includes verification of their validity in verification of the validity of the signature on some data. The notion of digital signature system implies fixation of the validity criterion. In particular, coincidence of a part of the data with a sequence of bits can be the validity criterion. In another example of the validity criterion, a data is considered to be valid if it is a pair $(X, Y)$, where $F(X)=Y$ and $F$ is a one-way function (E. Schneier, Applied Cryptography: Protocols, Algorithms, and Source Code in C, John Wiley & Sons, New York, 2nd edition, 1996, p. 29–30 and A. J. Menezes, P. C. Van Oorshot, S. A. Vanstone, Handbook of Applied Cryptography, CRC Press, 1997, p. 8–9), i.e., in the present case, a function which is not computationally invertible for anybody except, possibly, the signer.

Below, the keys for signing are called simply the keys, and the function of the keys used for other purposes is specified.

By the payment system operator one means an entity ensuring money transactions between the participants of payment operations. In particular, the payment system operator can keep the accounts of the participants of payment operations and issue value documents. The payment system operator can consist of one bank, or it can comprise several organizations, including banks, which are interconnected by various agreements. In particular, the payment system operator's secret keys can be a secret of one of the organizations belonging to the payment system operator, and the obligations of the payment system operator to a third party can also be obligations of only one of the organizations belonging to the payment system operator. In the case where the payment system operator comprises several different banks or other organizations, there must exist a secure system of settling mutual obligations between the organizations belonging to the payment system operator. To simplify the text of the application, instead of the term "payment system operator" the term "operator" is used in what follows.

By a payment server one means an apparatus with the help of which the operator serves effecting of payments. Such a payment server can consist of one or several computers or other devices.

By a payer device one means a device with the help of which the payer effects payments, and by a payee device one means a device with the help of which the payee effects payments.

By a payment certificate one means digital data presenting the operator's obligation. A payment certificate includes base, signature, and level. By the base of the payment certificate, also called the payment certificate base, one means data such that the signature on them, verified with the public money key, serves as a confirmation of the operator's obligations associated with this certificate; said signature is called the signature of the payment certificate or the payment certificate signature. The payment certificate signature is made with the operator's secret money key corresponding to the public money key used for verification of this signature. In what follows, the term "secret money key" is used instead of the term "the operator's secret money key".

The notion of level of a payment certificate is based on the notion of level of secret and public money keys. By the level of a public money key one means a certain numerical characteristic, associated with this public money key and defining a certain monetary value. The level can be represented, in particular, by one or several numbers. For example, the level can be represented by a nonnegative integral number L expressing in cents the monetary value defined by this level. In another example, the level can be represented by a collection of nonnegative integral numbers $L=(L_1, \ldots, L_k)$, and the monetary value expressed in cents can be defined by this level by the formula $L_1 \cdot N_1 + \ldots + L_k \cdot N_k$, where $N_1, \ldots, N_k$ are nonnegative integral numbers fixed in advance. In this case, the numbers $L_j$ are called orders, and the excess of one level above another one is defined order by order. By the. level of a secret money key one means the level of the corresponding public money key, and by the level of a payment certificate one means the level of the payment certificate signature, i.e., the level of that public money key with the help of which this signature can be verified.

A description of the method for effecting payments by the first variant is given below.

Effecting a payment comprises performing an operation of replenishing a payer device an operation of opening a payee's account, and a payment operation per se.

One replenishes the payer device by obtaining the payment certificate signature with the help of the payment server. Here, the payment certificate signature is obtained as the blind money signature of the operator. This leads to unlinkability of the payment certificate with the replenishment source and, thus, to ensuring the payer's privacy.

One replenishes the payer device with the help of the operation of primarily filling a payment certificate, in the course of which in the payer device one creates the base of the payment certificate and obtains the payment certificate signature with the help of the payment server. A separate description of the operation of creating the base of the payment certificate is given below.

The base of the payment certificate is created in the payer device. To create the base Base of the payment certificate one chooses the payee's arbitrary secret key DP and the corresponding public key EP. Such a choice is performed in the framework of any digital signature system. The chosen keys DP and EP are taken as the secret and, respectively, the public key of the payment certificate. An identifier of the public key EP is included in the base Base of the payment certificate. By the identifier of a public key one means arbitrary data which uniquely define the public key. In particular, the public key EP itself can be taken as such an identifier. In another example, the value of a cryptographic hash function (B. Schneier, Applied Cryptography: Protocols, Algorithms, and Source Code in C, John Wiley&Sons, New York, 2nd edition, 1996, p. 429) on the key EP can serve as an identifier. In one more example, the number of the public key received as it is registered by the operator or other entity can be taken as the identifier.

Including the identifier of the public key EP in the base Base of the payment certificate allows one to secure the payer when effecting a payment. Namely, when performing a payment operation, as described below, the operator can spend the values connected with a payment certificate only in accordance with a payer order signed by the payer. The signature on the payer order is made with the secret key DP and verified with the public key EP. Since the secret key DP is accessible only to the payer, such a signature also cannot be obtained without assistance of the payer.

In particular, the identifier of the public key EP is included in the base Base of the payment certificate as follows. As the base, one uses pairs (X, Y), where X=EP, Y=F(X), and F is a one-way function which, preferably, is collision free (B. Schneier, Applied Cryptography: Protocols, Algorithms, and Source Code in C, John Wiley&Sons, New York, 2nd edition, 1996, p. 30). In this case, one can use the data Y as the identifier of the base when performing operations with a payment certificate, and the relation Y=F(X) is used as the criterion of validity of the base, where by the criterion of validity of the payment certificate base one means the validity criterion of the digital signature system to which the money keys belong.

A separate description of obtaining the signature of a payment certificate as the blind money signature of the operator during primarily filling the payment certificate is given below.

During the operation of primarily filling a payment certificate with base Base one obtains the payment certificate signature with the help of the procedure for obtaining the blind digital signature of the operator in the framework of an arbitrary digital signature system giving the possibility of obtaining blind digital signature.

Several digital signature systems giving the possibility of making blind digital signature are known in the prior art (D. Chaum, Blind Signature Systems, U.S. Pat. No. 4,759,063, 19 Jul. 1988; D. Chaum, Blind Unanticipated Signature Systems, U.S. Pat. No. 4,759,064, 19 Jul. 1988; D. Pointcheval, J. Stern, Provably Secure Blind Signature, Lectures Notes in Computer Science, 1163, 1996, Springer, p. 252–265, et.al.). When making a blind digital signature on initial data M, the user provides the signer with blinded data M' obtained by blinding the data M. The signer provides the user with data S' to be unblinded obtained by processing the blinded data M' with the signer's secret key, and the user obtains the signature S on the initial message by unblinding. The signature property related to the data obtained by unblinding can be verified not only after the unblinding, but also before the unblinding if the digital signature system used allows this.

When performing the operation of primarily filling a payment certificate, one takes as the initial data the identifier BaseId of the base of the payment certificate, i.e., arbitrary data identifying this base. When obtaining the payment certificate signature by making a blind digital signature, one processes the blinded data with the secret money key corresponding to the replenishment amount, and by the correspondence between a replenishment amount and a secret money key one means the correspondence between the replenishment amount and the monetary value defined by the level of this secret money key.

The signature on the identifier BaseId obtained by unblinding the data to be unblinded obtained from the payment server is accepted as the payment certificate signature with base Base. The validity of the made payment certificate signature can be verified with the public money key corresponding to the secret money key used when obtaining the data to be unblinded.

Thus, after performing the operation of primarily filling a payment certificate, the payer device contains a payment certificate suitable for performing a payment operation.

When performing the operation of primarily filling a payment certificate, one delivers the blinded identifier of the base to the payment server as a part of the money demand formed in the payer device, and replenishes the payer device from the funds of the replenishment source indicated in this money demand. Here, from the operator's point of view, the source of replenishment of the payer device is the source of crediting, because as a result of replenishing the operator's money obligation appears in the payer device, and the payer becomes thus credited. Besides the replenishment source, the replenishment amount is also determined from the money demand if said amount is not determined by other circumstances, for example, by the terms of maintenance of the said replenishment source.

In particular, the payer's account or his bank card, can be used as the replenishment source. Here, by a bank card one means an arbitrary value card intended for transferring values. The security of remote withdrawal of values from the indicated replenishment source is ensured by a system of maintaining the replenishment source.

The operation of opening a payer's account with the operator can be performed in an arbitrary way. It is preferable that the account being opened admit a secure system of remote management.

An example of an account admitting a secure system of remote management is an account with a public key, also called a public key account. By a public key account one means an account kept by the operator and admitting management with the help of signed orders, the signature on which can be verified with the help of the public key connected with the account. To manage such an account, the holder of the account can use his secret key corresponding to the public key of the account and called the secret key of the account. The security of remote management by a public key account is ensured by the fact that the operator performs operations with this account following the signed orders, the signature on which is verified with the public key of the account and which signature is used by the operator as an evidence for the holder of the account.

Besides management with the help of orders signed with the secret key of the account, a public key account can also be managed by other methods. In particular, with such an account one can connect information identifying a person in charge of the account, i.e., a person having right to manage the account. Such information can be especially useful in the case of loss of the secret key of the account, because it will allow the holder to keep the control over his account in this case, too.

Moreover, if it is required to ensure the anonymity of the person in charge of the account, then the information identifying said person can be stored in the payment server in a concealed form, which does not allow one to link this information with the person in charge of the account without assistance of a person knowing this connection. For example, this hidden information can be the value of a cryptographic hash function on the identification data of the person in charge of the account, concatenated with a password, or simply said value on the password. Information identifying the person in charge of an account can be connected with the account by an order signed with the secret key of the account when opening the account as well as at other moments of time.

A separate description of a particular case of the operation of opening a public key account is given below. This description will be used below for references in the descriptions of other variants of the claimed invention. In particular, the operation of opening an account as described below can be used when opening both the payee's account and the payer's account, and the payer's account opened in this way can be used as a source of replenishing the payer device.

The operation of opening a public key account, in particular, can proceed as follows. The future holder of the account being opened accepts an arbitrary secret key of his as the secret key of the account. The public key corresponding to the secret key of the account is delivered to the payment server and taken as the public key of the account being opened. The holder of the account considered the account to be opened after obtaining a message signed by the operator, which confirms opening the account connected with the public key.

Besides the public key of the account, other data chosen by the holder and by the operator can also be connected with the account being opened. For example, the operator can assign the account being opened a number, which is communicated to the holder of the account. It is preferable that the data which the holder connects with the account would be purely declarative, which ensures automatical performance and, thus, the cheapness of the operation of opening an account and its maintaining. The account holder's privacy can be protected by the fact that the account is opened anonymously.

A separate description of a payment operation by the first variant is given below. The descriptions of other variants of the claimed invention presented below contain references to this description. When performing a payment operation by the first variant, the value contained in the payment certificate is spent completely. Since in other variants of the claimed invention one performs, in addition to such payment operations, payment operations making it possible to gradually spend the payment certificate value, the payment operation used in the present variant is described, for more definiteness, as a payment operation with annulment of the payment certificate.

The essence of a payment operation with annulment of the payment certificate is that in the payment server one credits the payee's account, thus canceling the operator's obligation associated with the payment certificate. The payee's account is credited in the case where the payment certificate have not been utilized, the payment certificate signature is valid, and the signature on the payer order is valid. One judges whether the payment certificate has already been used by the information on the used payment certificates which is contained in the payment server information storage, while the payment certificate signature and the payer order signed with the secret key of the payment certificate is delivered to the payment server with the help of the payee device. A more detailed description of a payment operation with annulment of the payment certificate is as follows.

When performing a payment operation, one forms in the payer device a payer order, in which one includes information about the payee and the identifier of the base of the payment certificate. The payer order signed with the secret key of the payment certificate is included in the data delivered to the payee device and called the payment data. In particular, the information about the payee included in the payer order contains the conditions of payment and the identifier of the payee's account if this account is not determined by other circumstances.

By the conditions of payment one means arbitrary data specifying the circumstances of effecting a payment. Such data can include, in particular, the payment amount and restrictions on the time taken to perform a payment. In particular, the conditions of payment may contain, possibly, in a form hidden from the operator, data describing the payee's obligations implied by the fact of effecting the payment.

In the payee device, one forms data called the payee order, which are delivered to the payment server. Here, one includes in the payee order the payer order contained in the payment data, and, possibly, other data, including, in particular, the conditions of payment. In addition, the payer order can be signed with the secret key of the payee's account if the payer's account is a public key account.

In the payment server, one credits the payee's account on the basis of the payee order and forms the operator's response to the payee order, by means of which response the payment operation is judged. Here, the payee's account is credited if the payment server information storage does not contain information saying that the payment certificate has already been used. Moreover, in the payment server, the validity of the payment certificate signature and the validity of the signature on the payer order are verified before crediting the payee's account, the signatures being taken from the payer order contained in the payee order received from the payee device. To prevent the multiple spending of the payment certificate, one enters the information on said payment certificate into the payment server information storage. To confirm the rights of the operator to effect the payment operation being performed, the signed payer order is also entered into the payment server information storage. The operator's response to the payer order is delivered to the payee device. During the execution of a payment operation, the payer's financial interests are protected by the operator's duty to verify the signature on the payer order, while the signed payer order stored in the information storage protects the operator against false accusations that he has misappropriated the value contained in the payment certificate.

The payer's privacy is protected, in particular, by that the payer order intended for delivery to the payment server is encrypted with the operator's encryption key, where by an encryption key of an entity one means a key for encrypting the messages sent for to this entity.

Besides the payer order, the payment data can include data intended for the payee, and, in particular, the identifier of the service or goods to be paid for.

In particular, the payee's security is ensured by the fact that the payee receipt signed with the operator's secret key is included in the operator's response to the payee order delivered to the payee. Here, by the payee receipt one means data confirming the fact of crediting the payee's account. Such a receipt, besides the amount of crediting and the identifier of the credited account, may also contain other data, in particular, the conditions of payment, the time taken to perform the crediting operation, etc. Having verified the validity of the operator's signature on the payee receipt, the payee regards the payment as being performed and delivers to the payer data confirming the fact of the performing of the payment.

Moreover, during the execution of a payment operation, in the payee device, by means of the operator's response to the payee order, one forms and delivers to the payer device data according to the performing of the payment for payer is judged. These data can contain, in particular, both the payee's consent to the fact that the payment operation has been successfully performed for the payee, and the payer receipt signed with the operator's arbitrary secret key. In the payment server, such a receipt is included in the operator's response to the payee order sent to the payee, and in the payee device the receipt is taken from the operator's response to the payee order received by the payee. Here, by the payer receipt one means data confirming the fact of spending the value contained in the payment certificate during the execution of a payment operation. Furthermore, the payer receipt may contain other data and, in particular, the conditions of payment and the time taken to perform a payment by the operator. In addition, before including the payer receipt into the operator's response to the payee order, one can encrypt said receipt with an arbitrary encryption key of the payer. Moreover, along with the data according to which the performing of the payment for the payer is judged, one can deliver to the payer device data connected with the fulfillment by the payee of his obligations implied by the fact of payment, and, in particular, the password of access to certain information.

During a payment operation, the value contained in the payment certificate can be spent either completely on the payment objectives, or partially on other objectives. In particular, a part of the payment certificate value can be returned to the payer device as change. A separate description of such an operation is given below.

When returning a part of the payment certificate value, one replenishes the payer device either by primarily filling the payment certificate or by replenishing the payment certificate already at hand. Moreover, the returned value of the payment certificate, i.e., the unspent part of the payment certificate value, can be returned in such a way that the returned value will remain unknown to the operator. Such a reimbursement of the returned value can be performed, for example, with the help of the method described in the patent: David Chaum, Returned value blind signature systems, U.S. Pat. No. 4,949,380, 14 Aug. 1990. In the best embodiment of the operation of returning a part of the payment certificate value to the payer device, the operator cannot distinguish primarily filling the payment certificate from replenishing a payment certificate already at hand, which promotes the protection of the payer's privacy.

The payee's security during the execution of a payment operation is ensured, in particular, by the fact that the payee receipt signed with the operator's arbitrary secret key is included into the operator's response to the payee order, while the performing of the payment for the payee is judged according to the validity of the signature on the payee receipt.

Furthermore, the payer can control the circumstances of performing a payment operation. For such a control, one includes the conditions of payment into the payer order when forming the payer order. In particular, the conditions of payment contained in the payer order, can include payee obligation data, i.e., data describing the payee's obligations implied by the fact of effecting the payment. To ensure that in case of need the payer could insist on the fulfillment by the payee of his obligations, the payee obligation data are signed with the payee's arbitrary secret key, and before the payer decides to perform a payment operation, one verifies in the payer device the validity of the signature on the payee obligation data and stores the signed payee obligation data. If it is required to conceal the payment objective from the operator, then in the payer device, when forming the payment data, one processes the payee obligation data with the help of an arbitrary one-way function, and includes the data obtained by the processing in the payee order as the conditions of payment.

In addition, during the execution of a payment operation the payee can playa role of a payer. Such a payment operation can be used for transferring values from the payer device to the payer's account.

Note a particular case of performing the operation of replenishing (the payer device) in which, the replenishment is performed from the funds of an intermediate payer. In particular, for I such performing of the operation of replenishing the payer device, the data blinded in the payer device during obtaining the blind money signature of the operator are subjected to an additional blinding in an intermediate payer's payer device, and the data to be unblinded that were received from the operator are subjected to the corresponding additional unblinding: The addition' blinding is intended for the protection of the privacy of the intermediate payer.

A common problem of all electronic queueing systems caring about the users' privacy is connected with potential possibility of identifying the user by net address information. Several theoretical approaches to the solution of this problem are described in the paper: D. Chaum, Security Without Identification: Transaction Systems to Make Big Brother Obsolete, Communications of the ACM, vol. 28 no. 10, October 1985 p. 1031–1034. A practically acceptable method of concealing the user's net address information from the addressee of the message can be to use remailers transferring the message to the addressee from their own address. In particular, in all variants of the claimed invention during the performing of a payment operation, the payer's address is, to a certain degree, hidden from the bank by that the payer order is delivered to the payment server via the payee device.

In some embodiments of the method for effecting payments by the first variant, payments in the range from micro-payments to business-to-business payments are possible, and the time taken to perform a payment depends only on the speed of action of the net connections and not on the payment amount, which is achieved by choosing levels of payment certificates such that the value defined by the level can take arbitrary values in the mentioned range, and by effecting a payment operation with the help of a beforehand-bounded number of payment certificates of suitable value, whose number is bounded in advance, or even a single payment certificate.

A description of the method for effecting payments by the second variant is given below.

One effects payments by the second variant in the same way as by the first variant, with the only exception, that besides replenishing the payer device with the help of primarily filling a payment certificate one also replenishes the payer device by replenishing the payment certificate. Further, in the best embodiment, when replenishing the payer device, the operator cannot distinguish primarily filling a payment certificate from replenishing a payment certificate already at hand, and the source of funds for such a replenishment is in no way connected with the source of funds for primarily filling.

If, when performing a payment operation by the first variant, one presents to the payment server the signature of a payment certificate whose level is the maximal available in the payer device, then the operator can detect the coincidence of this level with the level of the money keys used when replenishing the payer device, which can lead to linking the payment certificate used in a payment with the source of its replenishment. The probability of this is especially high in the case where the possible levels of payment certificates are such that the value defined by the level can take arbitrary values in the range from micro-payments to business-to-business payments. Replenishing the payer device by replenishing the payment certificate reduces the possibility of such linking considerably, because after replenishing the payment certificate, its level is the sum of several levels of signature with secret money keys. Thus, replenishing the payment certificate additionally promotes the protection of the payer's privacy. In addition, replenishing the payment certificate additionally allows one both to accumulate on a single payment certificate the returned values of used payment certificates reimbursed in payment operations, and to replenish said payment certificate from the funds of another source.

A separate description of the operation of replenishing the payer device with the help of replenishing a payment certificate is given below.

The operation of replenishing the payment certificate, i.e., the operation of obtaining a signature of the payment certificate, whose level exceeds the level of that payment certificate signature which is contained in the payer device at the beginning of the replenishment operation, is performed with the help of obtaining the blind money signature of the operator. Here, one takes as the initial data the payment certificate signature, which is contained in the payer device. For performing the operation of replenishing the payment certificate, the correspondence between the levels and the money keys must be such that the signature of level A on certain data X coinciding with the signature of level B on certain data Y corresponds to the signature of level (A+B) on the data Y. An example of such correspondence is the case where the level L is represented by a collection of nonnegative integral numbers $(L_1; L_2, \ldots, L_k)$ and for each index j from 1 to k there is a function $S_j$, whose calculation requires the secret key $K_j$. In the case where the functions $S_j$ commute with each other, i.e., $S_j(S_i(X))=S_i(S_j(X))$ for an arbitrary data X, arbitrary data allowing one to calculate the function $S_L$, which is the composition of the functions $S_L$, each of which occurs in. the composition with multiplicity $L_j$, can be taken as the money key corresponding to the level L. In this case, the data $S_L(X)$ are the signature on the data X with the money key corresponding to the level L. For example, such a key can be represented by a collection of data $(L, K_1, K_2, \ldots, K_k)$. An example of a specific system of such functions allowing an economical making and storage of secret keys is presented below in the description of the best embodiment of the method for effecting payments. Note that the operation of primarily filling a payment certificate is a particular case of the operation of replenishing the payment certificate, if the identifier of the base of the payment certificate is taken as the payment certificate signature of zero level.

In the best embodiment of the operation of replenishing payment certificates by means of increasing their level with the help of the operator making the blind payment certificate signature of higher level, the operator has no possibility to determine whether the payer replenishes a payment certificate already at hand, or he performs the operation of filling a newly created payment certificate. Here, when replenishing one and the same payment certificate, the payer can use different replenishment sources, without connecting them with each other.

A description of the method for effecting payments by the third variant is given below.

One effects payments by the third variant in the same way as by the first variant, with the only exception that one uses payment certificates which allow one to perform several payment operations. This is reflected in the fact that the operator opens a payment account connected with the given payment certificate and connects said account with the public key of the payment certificate. Further, one credits the payee's account during the execution of a payment operation from the funds of the payment account, which is credited from the funds of the payment certificate. Thus, it is possible to gradually spend the value contained in the payment certificate.

By a payment account one means an account kept by the operator, which gives a possibility to effect payments from said account by way of transferring a part of the amount on the account to another account or converting a part of the amount on the account into a different form for delivering said part to the payee. Here, the payment account contains information on the total amount of expenses, information on the total amount with which the account has been credited and information on the level of the payment account. Here, by the level of the payment account one means the level of the payment certificate signature presented to the operator for crediting the payment account. In particular, it is possible to use a public key account as a payment account.

A separate description of the operation of opening a payment account is given below.

To open a payment account connected with the base of a payment certificate it is sufficient to deliver the identifier of the base of the payment certificate to the payment server. In particular, opening a payment account can be combined with the first payment operation connected with the payment certificate. In the case where an account with a public key is used as a payment account, the public key of the payment certificate can be used as said public key. Moreover, to prevent opening a payment account associated with no payment certificate of positive level, the operation of opening a payment account can be combined with the operation of crediting the account.

A separate description of the operation of crediting a payment account is given below.

When performing the operation of crediting a payment account, one delivers to the payment server a payment certificate signature whose level can be chosen arbitrarily within the level of the payment certificate, and the payment account is credited according to the excess of the level of the delivered signature above the level of the payment account. In particular, the operation of crediting a payment account can be combined with the payment operation. In addition, the payer can credit his payment account in the course of several operations, increasing step by step the level of the payment certificate known to the operator. This allows the payer to weaken the possibility of linking a payment account and the sources of filling or replenishing the payment certificate connected with the account with the help of the level of the payment certificate.

A separate description of the payment operation used in the method for effecting payments by the third variant is given below. In distinction to the payment operation with annulment of the payment certificate as described earlier, the payment operation used in the method for effecting payments by the third variant is described as a payment operation involving a payment account.

A payment operation involving a payment account is performed in the same way as the above-described payment operation with annulment of the payment certificate, with the exception of the following. First, one credits the payee's account from the funds of the payment account, and, secondly, the payment certificate signature is not necessarily included in the payer order. Here, the payee's actions do not differ from his actions during the execution of a payment operation with annulment of the payment certificate. When performing a payment operation with annulment of the payment certificate, there arise problems with the range of payments. The point is that the value contained in the payment certificate can take only the values corresponding to one of the possible levels of payment certificates, or, what is the same, to one of the possible levels of money keys. Thus, if during the execution of a payment operation with annulment of the payment certificate only one payment certificate is used, then the payment amount can take only one of the predetermined values. Because of the necessity to effect payments in the range from micro-payments to business-to-business payments, one either has to do with a sufficiently complicated system of money keys or must use collections of payment certificates during a payment operation.

Application of a complicated system of money keys, generally speaking, leads to slow-down of payment operations, because making the money signature and verification of its validity require considerable amount of time. On the other hand, utilizing collections of payment certificates in a payment operation leads both to considerable growth of the number of the payment certificates used, which causes losses of various kinds, and to inconveniences for the payer, who is forced to ensure the availability of collections with the needed total value in the payer device. Advantages of the payment operation involving a payment account are that there are no problems with the range of payments because the payment amount is not connected with the structure of levels of money keys. Therefore, using payment accounts allows one to effect a payment in an arbitrary amount of money in the limits of the solvency of the payment account and, in particular, micro-payments are possible.

For the operator, advantages of using payment accounts are that potentially he can serve much greater number of clients, because one requires no resources for storing information about each payment completed. Furthermore, an essentially smaller number of records connected with payment certificates accelerates the search of the record connected with a specific payment certificate, or ascertainment of the fact that such a record is absent during the execution of a payment operation. The deficiency of using payment accounts is in that it is possible to link all the payments effected with using one and the same payment account. Thus, the maximal number of the payment certificates used simultaneously is proportional to the operator's resources.

Further, since the proportion of the number of the payment certificates used to the number of the operator's clients can be limited either by the cost of the operation of opening a payment account or by the cost of the operation of making blind money signature, it follows that the number of clients that can be served by the operator is proportional to the operator's resources.

Another advantage of performing the payment operation involving a payment certificate in comparison to the same payment operation with annulment of a payment certificate, in which one uses a collection of payment certificates, is that the time taken to effect a payment depends only on the speed of action of the net connections, and not on the payment amount, because the fixed size of payer orders makes it possible to indicate any practically possible amount of money as the payment amount.

In addition, a payment account connected with one of the payment certificates can be used in the operation of replenishing the payer device as the replenishment source. Funds can thus be transferred from the payment account to the payer device.

A description of the method for effecting payments by the fourth variant is given below.

One effects payments by the fourth variant in the same way as by the third variant, with the only exception that as in the method for effecting payments by the second variant described above one additionally performs an operation of replenishing a payment certificate. Additional advantages of performing such an operation are also indicated in the above description of the method for effecting payments by the second variant.

The description of the apparatus for effecting payments is given below. Using this apparatus for effecting payments, it is possible to realize the claimed method for effecting payments by the third and fourth variants.

The apparatus for effecting payments contains a payer device, a payee device, and a payment server connected with telecommunication nets. Each of these devices can be realized by a computing device programmed in the corresponding way.

Such a computing device can be chosen from a large number of known electronic devices, for example, personal computers. Such computing devices include, in an internal or an external way, storage devices, which are intended for storing data or codes of programs that are involved in effecting payments. In addition, such computing devices comprise auxiliary devices, for example, modems, which enable the computing devices to communicate with other similar devices. The communication environment, in the framework of which the data are exchanged, can also be any of a large number of possibilities, including telephone lines, cable, the Internet, satellite or radio transmissions, optical-fiber connections, etc. In other words, it is not assumed that the invention is limited with regard to either the types of devices that are used or the methods of communication that are employed.

The payer device, the payee device, and the payment server can be realized by the wide variety of programming means based on the corresponding algorithms. Here, the payer device contains a means for replenishing the payer device by the use of making a blind money signature of an operator, a means for creating a payment certificate base by processing the public key of the payment certificate with a one-way function, a means for storing the created payment certificate base in a storage device, and a means for forming a payer order signed with the secret key of the payment certificate. Here, the means for replenishing the payer device by the use of making a blind money signature of an operator is realized by a means for increasing the level of the payment certificate signature.

Said means for increasing the level of the payment certificate signature has a means for forming a money demand including a blinded payment certificate signature, a means for unblinding the data to be unblinded comprised in a response to the money demand, and a means for entering the result of un blinding into said storage device.

The means for increasing the level of the payment certificate signature is intended for replenishing the payer device either by primarily filling a payment certificate or by replenishing a payment certificate. In the former case, with the help of the means for increasing the level of the payment certificate signature one processes the payment certificate signature of zero level, which coincides with the identifier of the payment certificate base created with the help of said means for creating a payment certificate base. In the latter case, with the help of the means for increasing the level of the payment certificate signature, one processes the payment certificate signature, which is contained in the payer device and was entered into the storage device of the payer device in one of the previous operations of replenishing the payer device. In both cases, the level of the payment certificate increases as a result of replenishment of the payer device.

The payee device contains a means for forming a payee order including the payer order. In addition, the payee device contains a means for opening a public key account.

The payment server contains a means for making a money signature, a means for performing a payment operation, a means for serving a database of payment accounts, and a means for serving a database of accounts.

Here, by the means for serving an arbitrary database one means a means for performing operations with records of the database, including creating such records, their reading, and modification.

In addition, the means for serving a database of accounts can have some means intended for maintaining accounts, which are records in this database and are stored in the storage device. Among such means are, in particular, a means for opening a public key account, a means for crediting an account and a means for debiting an account.

In addition, the means for serving a database of payment accounts can have some means intended for maintaining the payment accounts which are records in this database and are stored in the storage device. Among such means are, in particular, a means for opening a payment account, a means for verifying the money signature, and a means for crediting a payment account.

In addition, the means for performing a payment operation contained in the payment server has a means for verifying a signature on the payer order and a means for making a signed payee receipt.

The means for processing the money demand, which is contained in the payment server, uses said means for making a money signature when performing an operation of replenishing the payer device.

In addition, the payment server can contain a means for making a signed payee receipt, and the payee device may contain a means for verifying the signed payee receipt.

In particular, the mentioned means for forming a payer order signed with the secret key of the payment certificate can have a means for forming a demand for crediting a payment account, which, in turn, can have a means for decreasing the level of the payment certificate signature. The purpose of the means for decreasing the level of the payment certificate signature is as follows: from the payment certificate signature of some level, which signature is contained in the payer device, to make another signature of the payment certificate, which has lower level and is intended for delivery to the payment server as a part of the demand for crediting a payment account.

In particular, the payer device can also contain a means for opening a public key account.

In addition, the payer device, the payee device, and the payment server can be equipped by means for encryption of outgoing messages and by means for decryption of incoming messages.

BRIEF DESCRIPTION OF THE DRAWINGS

In what follows, the present invention is clarified by the description of specific examples of its implementation and by accompanying drawings, where.

DETAILED DESCRIPTION OF THE PREFERRED EMBODIMENTS

Figure 1:
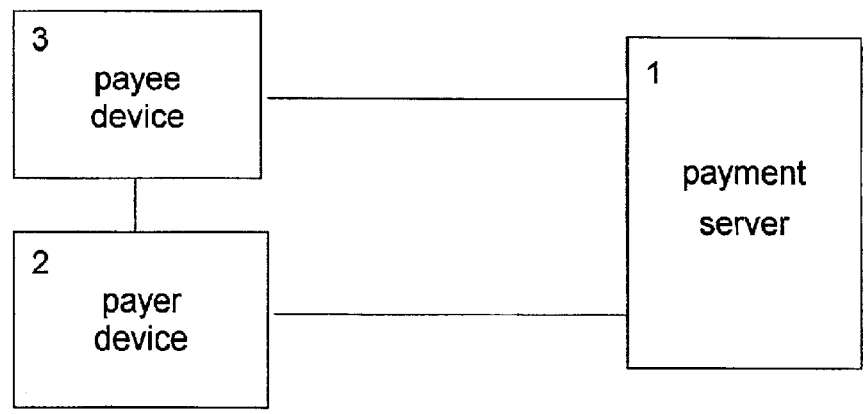
FIG. 1 shows a flow-chart of the apparatus for effecting payments.

In the best embodiment of the method for effecting payments by each of the variants, payments are effected in the framework of a payment system, whose operator comprises a variety of banks, and the system has many payers and payees. Further, both the payers and the payees utilize devices simultaneously containing both a payer and a payee device. Furthermore, in the description of the best embodiment of the invention, such a device is called the "Electronic wallet".

Before serving a client, a bank belonging to the payment system performs preparatory actions. Since the preparatory actions are performed in the same way in the best embodiment of each of the variants of the claimed method, a separate description of the best way of performing of these operations is given below.

At the stage of preparatory actions, one fixes a digital signature system giving a possibility of making blind digital signature. This system is intended for making and verification of money signature, and below it is called a money signature system. One also fixes a collection of admissible levels, i.e., quantities each of which defines a certain monetary value. Here, the collection of admissible levels is chosen so that an arbitrary monetary value presenting a practical interest when replenishing the payer device would be represented by some level. For each admissible level, the bank chooses a secret money key corresponding to this level and a public money key corresponding to the secret money key in the framework of a fixed money signature system. Here, the secret money key corresponding to each of the admissible levels is chosen so that the signature of level A on some data X, X coinciding with the signature of level B on certain data Y, corresponds to the signature of level (A+B) on the data Y. Information on the public money keys and the monetary values corresponding to admissible levels is made public and is entered into the storage devices of "Electronic wallets".

One also fixes a digital signature system intended for signing the messages used when effecting payments. In the framework of this system, the bank chooses secret keys and the corresponding public keys. The information on public keys is made public and is entered into the storage devices of "Electronic wallets".

In addition, one fixes the structure and the validity criterion of payment certificate bases, as well as the way of including the identifier of the public key of the payment certificate into the base of the payment certificate. To this end, one fixes a cryptographic hash function F which takes values in bit strings and, preferably, is collision free. Payment certificate bases are pairs (Y, X), where Y is the public key of the payment certificate, which key is chosen in the framework of a fixed signature system and used as its own identifier. Further, a base with such a structure is considered to be valid if F(Y)=X. One takes the data X as the identifier BaseId of the base of the payment certificate.

The possibility of realization of the preparatory actions described above in the best embodiment of the method for effecting payments by each of the claimed variants is clarified by the following example.

EXAMPLE 1

As the money signature system, one uses a system based on the digital RSA-signature (B. Schneier, Applied Cryptography: Protocols, Algorithms, and Source Code in C, John Wiley&Sons, New York, 2nd edition, 1996 and A. J. Menezes, P. C. Van Oorshot, S. A. Vanstone, Handbook of Applied Cryptography, CRC Press, 1997). In this system, a secret key is the pair (N, D), where D is a secret exponent and N is the modulus. Here, the corresponding public key is a pair (N, E), where E is a public exponent satisfying the condition $X^{E \cdot D}=1$ (mod N) for each integral number X coprime to N. The RSA system allows several methods of making a blind digital signature. For example, one of these methods is described in the patent: D. Chaum, Blind Signature Systems, U.S. Pat. No. 4,759,063, 19 Jul. 1988, and another one is described in the patent: D. Chaum, Blind Unanticipated Signature Systems, 15 U.S. Pat. No. 4,759, 064, 19 Jul. 1988.

As an admissible level, one takes an arbitrary collection of nonnegative integral numbers $L=(L_1, L_2, L_3)$, and such a level defines the monetary value expressed in cents by the formula $L_1 \cdot N_1 + L_2 \cdot N_2 + L_3 \cdot N_3$, where $N_{1=100}^2$, $N_2=100$, $N_3=1$.

For each admissible level, the corresponding secret money key and the public money key corresponding to the secret money key are chosen in the framework of the RSA-signature system as follows. As the modulus of each of the public and secret money keys, one uses an arbitrary RSA-modulus N, for which the integral numbers $E_{1=3}$, $E_{2=17}$, $E_{3=5}$ are admissible as public exponents. Below, the numbers $E_1$, $E_2$, $E_3$ are called the basic public exponents. One takes the key with public exponent $E=E_1^{L1} \cdot E_2^{L2} \cdot E_3^{L3}$ as the public money key corresponding to the level L. As the secret money key corresponding to the level L one takes the key with secret exponent $D=D_1^{L1} \cdot D_2^{L2} \cdot D_3^{L3}$, where $D_j$ is the secret exponent corresponding to the basic public exponent $E_j$. Means for creating keys in the RSA system are well known (B. Schneier, Applied Cryptography: Protocols, Algorithms, and Source Code in C, John Wiley&Sons, New York, 2nd edition, 1996 and A. J. Menezes, P. C. Van Oorshot, S. A. Vanstone, Handbook of Applied Cryptography, CRC Press, 1997). The modulus N and basic public exponents $E_1$, $E_2$, $E_3$ are published as the information about public money keys. The data $N_{1=100}^2$, $N_2=100$, $N_{3=1}$ are published as the information on the monetary values corresponding to the admissible levels.

The cryptographic hash function F used of the criterion of validity of payment certificate bases, is chosen so that its value on the bit sequence X is obtained by concatenation of bit sequences H(X) and Y, where H denotes the known hash function SHA-1 (A. J. Menezes, P. C. Van Oorshot, S. A. Vanstone, Handbook of Applied Cryptography, CRC Press, 1997, p. 348), Y=1111 . . . 1110, and the number of the unit bits in Y is such that the total number of bits in F(X) is equal to the number of bits in the modulus N.

As the digital signature system intended for signing the messages used when effecting payments, one fixes the RSA system with public exponent 3, i.e., the RSA system in which the public exponent is fixed and equal to 3. In the framework of this system, the bank chooses a secret key DB and the corresponding public key EB. The modulus of the public key EB is made public as the information about this key.

A description of the best embodiment of the method for effecting payments by the first variant is given below.

Having performed the preparatory actions described above, the payee opens a public key account in the bank. Here, the account is opened in the following way.

As the secret key of the account being opened, the payee takes his secret key created specially for this purpose in the framework of the signature system fixed at the stage of preparatory actions. The public key corresponding to the secret key of the account is delivered to the payment server via open telecommunication nets. In the payment server, one takes the delivered public key as the public key of the account being opened, assigns a number to the account being opened, and creates in the storage of accounts a record containing the number of the account, the public key of the account, and other attributes of the account. The payee considered the account to be opened after receiving a message signed with the bank's secret key, which confirms opening an account connected with the public key of the account. Further, the signature on the message is stored in the storage device of the "Electronic wallet", which will allow one in the future to make justified claims to the bank if the bank has not fulfilled its obligations connected with the opened account.

Advantages of the described variant of opening an account are that the operation of opening an account proceeds in a remote manner in the real-time mode. In addition, opening an account in the payment server proceeds automatically, because in particular, it requires no verification of the data identifying the account holder. Thus, this variant of opening an account is very economical for the bank and very convenient for the bank's clients. In addition, as every public key account, an account opened as described above admits a secure remote management, and a relatively small size of the number of the account allows one to reproduce it by hand, manually in particular, for indicating the designation of a postal money order.

In the best embodiment, the payer uses an arbitrary means for money operations which allows a secure remote management as a source of replenishment of his "Electronic wallet".

When creating the payment certificate base Base in the course of performing the operation of primarily filling a payment certificate, as the payee1s secret key DP and the corresponding public key EP one chooses keys specially created for this purpose. Here, the keys DP and EP are chosen in the framework of the signature system fixed at the stage of preparatory actions.

During the operation of primarily filling a payment certificate, the blinded identifier BaseId of the base of the payment certificate is delivered to the payment server as a part of a money demand. Here, the data necessary for remote withdrawal of funds from the utilized replenishment source are also included in the money demand.

Prior to performing a payment operation, the payee obligation data are signed with the payee's arbitrary secret key, and before the payer decides to perform a payment operation, in the payer device one verifies the validity of the signature on the payee obligation data and stores the signed payee obligation data.

The information about the payee included in the payer order when performing a payment operation contains the identifier of the payee's account and the conditions of payment. The result of processing the payee obligation data with the help of a fixed one-way function is included in the conditions of payment. The payer order is encrypted with the operator's encryption key.

A session key for symmetric encryption is included in the payee order and the payee order itself is encrypted with the operator's encryption key.

The payee receipt signed with the operator1s secret key is included in the operator's response to the payee order, and the operator's response to the payee order is encrypted with the session key contained in the payee order. The payee judges the performing of the payment according to the validity of the signature on the payee receipt.

In the payee device, by means of the operator1s response to the payee order, one forms and delivers to the payer device the data confirming the payee's consent to the fact that the payment operation has been successfully performed.

The part of the payment certificate value that was not spent on the payment objectives is returned to the payer device as change.

The possibility of realization of the above-described best embodiment of the method for effecting payments by the first variant is clarified by the following example.

EXAMPLE 2

The preparatory actions are performed as in Example 1 described above.

The payee, who is a seller in the present example, opens an account with public key ES in the bank as described above. Further, in the storage device of the seller's "Electronic wallet" one creates a record with information about the opened account, which information contains the secret key DS corresponding to the public key ES, the number AccountId of the opened account, and other attributes of the account.

In this example, the replenishment source of the payer1s "Electronic wallet" is the payer's account, which he opens in exactly the same way as the payee. The payer delivers a certain amount of money to the account opened by him by a postal money order; for the sake of definiteness, let it be 200 dollars.

Using the opened account as the replenishment source, the payer replenishes his "Electronic wallet" with the help of the operation of primarily filling a payment certificate.

During the operation of primarily filling a payment certificate, the base of the payment certificate is created by choosing the secret signature key DP and the corresponding public signature key EP in the framework of the RSA system with public exponent 3. Since the public exponent is fixed, the public key is represented by a single modulus. As indicated above, means for creating such keys are well known. One takes the data (EP, X) as the base (Y, X) of the payment certificate, here X is obtained from the key EP with the help of the means for calculating the function F described in Example 1 presented above. Such a means is realized by programming means on the basis of the above description for the function F.

During the operation of primary filling a payment certificate, the blinded identifier BaseId of the payment certificate b se is delivered to the payment server as a part of the money demand. One also include in the money demand the required replenishment amount, for the sake of definiteness 200 dollars, and the payer's account number, and along with the money demand one delvers to the payment server the signature of said demand with the secret key of the payer's account. Here, the payer device is replenished from the funds of the account indicated in the money demand, after verification of the signature contained in the money demand with the help of the public key of the account indicated in the money demand.

To blind the identifier BaseId of the payment certificate base one chooses a level $M=(M_1, M_2, M_3)$ such that $L_1$ does not exceed $M_1$, $L_2$ does not exceed $M_2$, and $L_3$ does not exceed $M_3$, where $L=(L_1, L_2, L_3)$ is the level of that secret money key which will be used in the payment server when replenishing the payer device. The level M to be chosen depends on the required replenishment amount expressed in cents, i.e., equal to 20,000 in the present example. When choosing the level M, one assumes that the level L of the secret money key used by the bank is defined as follows according to the rule fixed in advance in the payment system.

First of all, by the required amount of money contained in the money demand and by the funds on the payer's account, one defines the replenishment amount. In this example, to the moment of performing the operation of replenishing the funds of the account expressed in cents make the quantity 19,975. This amount has formed as follows. For crediting the account with 20,000 cents, which corresponds to 200 dollars of the postal money order, the bank took commission in the amount of 50 cents, so that 19,950 cents appeared on the account. During the time elapsed from the moment of crediting the account with this amount to the moment of beginning of the operation of replenishing the payer device, the bank, first, added the interest in the amount of 30 cents, and, secondly, charged 5 cents for maintenance of the account. As a result, to the moment of performing the operation of replenishing the funds of the account make the quantity 19,975 cents. In addition, the bank charges 60 cents for the operation of replenishing a payer device. Thus, the replenishment amount in this example makes 19,915 cents. The level L is defined according to the replenishment amount, which is equal to 19,915 in this example, with the help of the rule fixed in the payment system so that the relation $L_1 \cdot N_1 + L_2 \cdot N_2 + L_3 \cdot N_{3=19,915}$ cents would hold. In the present example, $L=(1, 99, 15)$.

In any case, the fixed rule of defining the level L in accordance with the required replenishment amount guarantees, in this example, that $L_1$ does not exceed 2, while $L_2$ and $L_3$ do not exceed 99. Thus, one takes the data (2, 99, 99) as the level M.

After the level M is chosen, the initial data X, which is taken equal to the identifier BaseId of the payment certificate base during primarily filling the payment certificate, is blinded in accordance with the relation $X'=F \cdot X \pmod{N}$, where $F=R^U \pmod{N}$, $U=U_1 \cdot U_2 \cdot U_3$, $U_1=E_1^{M1}$, $U_2=E_2^{M2}$, $U_3=E_3^{M3}$, and R is a randomized integral number of suitable size.

In the payment server, the signature on the blinded data X' with the secret money key corresponding to the level L is taken as the data S' to be unblinded. Thus, in this example, the. data X' is processed with the secret money key with modulus N and secret exponent $D=D_1^{L1} \cdot D_2^{L2} \cdot D_3^{L3}$. After that, the data S' are delivered to the payer device.

In the payer's "Electronic wallet", from the received data S' to be unblinded one makes the signature S of the payment certificate by unblinding the received data S' in accordance with the relation $S=S_1 \cdot T_I \pmod{N}$, where $T=RV \pmod{N}$, $T=R^V \pmod{N}$, $V=V_1 \cdot V_2 \cdot V_3$, and $V_1=E_1 M1 \cdot L_1$, $V_2=E_2^{M2 \cdot L}{}_2$, $V_3=E_3^{M3 \cdot L}{}_3$. The made signature S is stored in the storage vault. As a result, a payment certificate with value 19,915 cents appears in the payer's "Electronic wallet".

The payer willing to pay 43.50 dollars to the seller for some goods, prepares the payment data Payment Data, including in them the payer order PayerOrder signed with the secret money key of the payment certificate DP and data A intended for the seller and consisting in this example of the name of the paid goods and the identification data of the recipient of the goods. The payer order PayerOrder consists of the public key of the payment certificate EP, the signature S of the payment certificate, the seller's account number AccountId, and the data C defining the conditions of payment. In the present example, the payer takes as C the seller's account number AccountId and the value of the hash function H on the text of the seller's obligation valid in the case of a payment, namely, an obligation to supply the corresponding goods to the person with the indicated identification data.

The seller willing to accept the payment forms the payee order SellerOrder=(AccountId, PayerOrder) encrypted with the bank's public encryption key and delivers it to the bank.

Having made sure that the list of the used payment certificates contains no record on the payment certificate with public key EP, having verified the validity of the signature on the payer order PayerOrder with the help of the public key EP, and having verified the validity of the signature S of the payment certificate, the bank enters a record including the public key EP and the signed payer order PayerOrder into the list of used payment certificates and credits the account with number AccountId with an amount of 43.49 dollars, under the assumption that the bank charges 1 cent for performing a payment operation. After that, the bank forms the payer receipt confirming the fact of crediting the account with number AccountId with an amount of 43.49 dollars, signs it, and delivers to the seller, who, having verified the validity of the bank's signature on the receipt received, regards the payment as being effected and informs the payer about successfully effecting the payment.

The rest value of the payment certificate, making quantity (19,915–43.50) cents in the present example, is returned by replenishing the payer device, and the replenishment can be performed either by primarily filling the payment certificate or by replenishing a payment certificate already at hand. To this end, one includes in the payer order a blinded signature of that payment certificate whose value will increase due to the returned value, while the corresponding money signature of the operator, delivered to the payer device through the payee device along with the other data is included in the operator's response to the payee order.

A description of the best embodiment of the method for effecting payments by the second variant is given below.

In the best embodiment of the method for effecting payments by the second variant, one performs all actions that are performed in the best embodiment of the method for effecting payments by the first variant.

Moreover, one performs an additional operation replenishing the payment certificate, which is realized so that the operator cannot distinguish the operation of primarily filling a payment certificate from the operation of replenishing a payment certificate. One performs the operation of replenishing the payment certificate at an arbitrary moment of time before the payment operation and one uses for replenishing a payment certificate whose value is not sufficient of the payment operation.

The possibility of realization of the above-described best embodiment of the method for effecting payments by the second variant is clarified by the above-described Example 2, where the possibility of realization of the best embodiment of the method for effecting payments by the first variant is clarified, and by the following Example 3, where the possibility of realization of the best embodiment of replenishing the payer device with the help of replenishing the payment certificate is clarified.

EXAMPLE

In this example, we use agreements and notation adopted in Example 1 described above.

The operation of replenishing the payment certificate, i.e., the operation of obtaining a payment certificate signature whose level exceeds the level of the payment certificate signature contained in the payer device at the beginning of the replenishment operation, is performed by obtaining the blind money signature of the operator. Here, as the initial data one takes the payment certificate signature contained in the payer device. Suppose that the payer's "Electronic wallet" contains a payment certificate with signature $S_1$ of level (0, 2, 30). Suppose that the value of this payment certificate, which is equal to 2 dollars and 30 cents in the present case, is not sufficient for the payer to make a certain purchase. In order to make this purchase anyway, the payer replenishes his "Electronic wallet" by replenishing the payment certificate.

For this purpose, one delivers the blinded signature $S_1$ of the payment certificate to the payment server as a part of the money demand. One also includes in the money demand the required replenishment amount, equal, for the sake of definiteness, to 50 dollars, and the payer's account number, and along with the money demand one delivers to the payment server the signature of said demand with the secret key of the payer's account. Here, the payer device is replenished from the funds of the account indicated in the money demand after verification of the signature contained in the money demand with the help of the public key of said account.

To blind the signature $S_1$ of the payment certificate, as in Example 2 presented above, one chooses a level $M=(M_1, M_2, M_3)$ such that $L_1$ does not exceed $M_1$, $L_2$ does not exceed $M_2$, and $L_3$ does not exceed $M_3$, where $L=(L_1, L_2, L_3)$ is the level of that secret money key which will be used in the payment server when replenishing the payer device. One chooses the level M depending on the required replenishment amount as in Example 2. In the present example, $M=(0, 5, 99)$.

As in Example 2, one defines the replenishment amount by the required amount contained in the money demand and by the funds on the payer's account. Suppose that the replenishment amount in this example turns out to be equal to 47 dollars and 13 cents, i.e., 4,713 cents. One defines the level L by the replenishment amount as in Example 2. In the present example, $L=(0, 47, 13)$.

After the level M is chosen, the initial data X, which is taken equal to the identifier BaseId of the base of the payment certificate during primarily filling the payment certificate, is blinded in accordance with the relation $X'=F \cdot X$ (mod N), where $F=R^U$ (mod N), $U=U_1 \cdot U_2 \cdot U_3$, $U_1=E_1^{M1}$, $U_2=E_2^{M2}$, $U_3=E_3^{M3}$, and R is a randomized integral number of suitable size.

In the payment server, the signature on the blinded data X' with the secret money key corresponding to the level L is taken as the data S' to be unblinded. Thus, in this example, the data X' is processed by the secret money key with modulus N and secret exponent $D=D_1^{L1} \cdot D_2^{L2} \cdot D_3^{L3}$. After that, the data S' are delivered to the payer device.

In the payer's "Electronic wallet", from the received data S' to be unblinded one makes the signature S of the payment certificate by unblinding the received data S' in accordance with the relation $S=S' \cdot T^1$ (mod N), where $T=R^V$ (mod N), $V=V_1 \cdot V_2 \cdot V_3$, and $V_1=E_1^{M1-L}{}_1$, $V_2=E_2^{M2-L}{}_2$, $V_3=E_3^{M3-L}{}_3$. The made signature S is stored in the storage device instead of the signature $S_1$ stored before. Here, the level of the signature S is equal to the sum of the level of the signature $S_1$, i.e., (0, 2, 30) in the present example, and the level $L=(0, 47, 13)$. Thus, the level of the signature S is equal to (0, 49, 43), and the payment certificate value has increased to 49 dollars and 43 cents.

A description of the best embodiment of the method for effecting payments by the third variant is given below.

The preparatory actions, opening the payee's account, replenishing of the payer device, and the payee's actions during the execution of a payment operation are performed as in the above-described best embodiment of the method for effecting payments by the first variant.

As in the above-described best embodiment of the method for effecting payments by the first variant, before the payer decides to perform a payment operation, in the payer device one verifies the validity of the signature on the payee obligation data and stores the signed payee obligation data.

When performing a payment operation, the identifier of the payee's account and the conditions of payment are included in the payer order as information about the payee. One includes in the conditions of payment the result of processing the payee obligation data with the help of a fixed one-way function. The payer order is encrypted with the operator's encryption key.

A session key for symmetric encryption is included in the payee order, and the payee order itself is encrypted with the operator's encryption key.

The payee receipt signed with the operator's secret key is included in the operator's response to the payee order, and the operator's response to the payee order is encrypted with the session key contained in the payee order. The payee judges the performing of the payment according to the validity of the signature on the payee receipt.

In the payee device, by means of the operator's response to the payee order, one forms and delivers to the payer device data confirming the payee's consent to the fact that the payment operation has been successfully performed.

The operator opens a payment account connected with each of the payment certificates and connects it with the public key of the payment certificate, and the funds of the payment account are spent in one or several payment operations. Here, the public key account whose public key coincides with the public key of the payment certificate is used as the payment account. The funds appear on the payment account as a result of one or several operations of crediting the payment account performed from the funds of the value contained in the payment certificate, and the operation of opening a payment account is combined with the operation of crediting this account that was first in time.

When performing the operation of crediting a payment account, one delivers to the payment server a payment certificate signature, whose level can be chosen arbitrarily within the level of the payment certificate. Moreover, each operation of crediting a payment account is combined with one of the payment operations.

The possibility of realization of the above-described best embodiment of the method for effecting payments by the third variant is clarified by the following example.

EXAMPLE 4

In this example, we use agreements and notation adopted in Example 1. The preparatory actions, opening the seller's account, replenishing the payer device, and the seller's actions during the execution of a payment operation are performed in this example as in Example 2 described above.

Examples of three payment operations are given below. Here, the first one of the payment operations described below, which is the first (in time) operation performed with the use of a payment certificate, is combined with the operation of opening a payment account and its crediting. The second one of the payment operations described below is combined with the operation of crediting an already opened payment account. The third one of the payment operations described below is performed under the conditions when the funds on the payment account already suffice for performing such a payment operation.

Below, given is a description of the first (in time) payment operation performed with the use of a payment certificate, which is combined with the operation of opening a payment account and its crediting.

Suppose that the payer device contains a payment certificate with base (EP, X) and signature S of level (2, 12, 45). The payment certificate value is equal to 212 dollars and 45 cents. Suppose, furthermore, that the payment certificate has not already been used in one of the payment operations.

The payer willing to pay the seller an amount of 18.999 dollars for some goods, prepares the payment data Payment Data, including in them the payer order PayerOrder signed with the secret key of the payment certificate DP, and the data A intended for the seller and consisting in this example of the name of the paid goods and the identification data of the recipient of the goods.

The payer order PayerOrder consists of the public key EP of the payment certificate, the signature $S_1$ of the payment certificate, the seller's account number AccountId, and the data C defining the conditions of payment. In the present example, the payer takes as C the seller's account number AccountId and the value of the hash function H on the text of the seller's obligation valid in the case of a payment, namely, an obligation to supply the corresponding goods to the person with the indicated identification data.

The public key EP included in the payer order PayerOrder is used in the payment server for opening the payment account connected with this key. The signature $S_1$ of the payment certificate included in the payer order PayerOrder is used in the payment server for crediting the payment account with public key EP.

The signature $S_1$ is made in the payer device from the signature S of the payment certificate. Here, the level $L=(L_1, \ldots, L_3)$ of the signature $S_1$ is chosen in so a way that, on the one hand, the value corresponding to this level would suffice for performing the present payment operation, and, on the other hand, it would not exceed the level of the signature S in each of the three orders. Another aim of such a choice is to hide the level of the signature S contained in the payer device from the operator. In the present example, the level of the signature S is represented by the collection (2, 12, 45), and the value sufficient for performing the present payment operation, expressed in cents, is, in the present case, 1899.9 cents. Thus, the restrictions on the choice of the level $L=(L_1, \ldots, L_3)$ are as follows: first, $L_1$ does not exceed 2, $L_2$ does not exceed 12, $L_3$ does not exceed 45, and, secondly, the quantity $L_1 \cdot N_1 + L_2 \cdot N_2 + L_3 \cdot N_3$, where $N_1 = 100^2$, $N_2 = 100$, $N_3 = 1$, must be at least 1899.9 cents. The level L satisfying these conditions is chosen with the help of a random number generator and, in the present example, $L=(1, 3, 14)$. The signature $S_1$ is made with the help of a computing device programmed in the corresponding way; in accordance with the relation $S_1 = S^V \pmod{N}$, where $V = V_1 \cdot V_2 \cdot V_3$, $V_1 = E_1^{M1-L}{}_1$, $V_2 = E_2^{M2-L}{}_2$, $V_3 = E_3^{M3-L}{}_3$, and the level $(M_1, \ldots, M_3)$ is equal to the level (2, 12, 45), i.e., to the level of the signature S.

The seller willing to accept the payment forms his payee order SellerOrder=(AccountId, PayerOrder) encrypted with the bank's public encryption key, and delivers it to the bank.

Having made sure that the payment account database contains no record of a payment account with public key EP and having verified the validity of the signature $S_1$ with the help of a public or a secret money key, the bank opens a payment account and enters the corresponding record into the payment account database. Here, first, the opened account is credited with the amount corresponding to the level $L=(1, 3, 14)$ of the signature $S_1$, i.e., in the present example, with an amount of 103 dollars and 14 cents. In addition, one debits the opened payment account with an amount of 50 cents, which is equal to the charge for opening the payment account. After that, the payment operation per se is performed. Namely, having verified the signature on the payer order PayerOrder with the help of the public key EP of the payment account, the bank enters the signed payer order PayerOrder into the information storage, debits the payment account with an amount of 1899.9 cents and credits the account with number AccountId with an amount of 1898.9 cents, under the assumption that the cost of performing a payment operation by the bank is equal to 1 cent. After that, the bank forms the payer receipt confirming the fact of crediting the account with number AccountId with an amount of 1898.9 cents, signs it, and delivers to the seller, who, having verified the validity of the bank's signature on the receipt received, regards the payment as being effected and informs the payer about successfully effecting the payment.

A description of a payment operation, which is combined with the operation of crediting an already opened payment account, is given below. Generally speaking, the payee participating in this operation is in no way connected with the payee from the first payment operation described above.

Suppose that the payer device contains a payment certificate with base (EP, X) and signature S of level (2, 12, 45). The payment certificate value is equal to 212 dollars and 45 cents. Suppose that the payment account connected with the given certificate is already opened, the total amount of expenses of this payment account does not exceed the amount of 6732.8 cents, and the level of the signature delivered to the operator in one of the previous operations of crediting the payment account does not exceed the level (1, 3, 14). Thus, the payment account has been credited with an amount of 103.14 cents in the course of the previous crediting operations.

The payer willing to pay the seller an amount of 3699.9 cents for some goods prepares the payment data Payment Data, including in them the payer order PayerOrder signed with the secret key DP of the payment certificate, and the data A intended for the seller and consisting in this example of the name of the paid goods and the identification data of the recipient of the goods.

Since the payment amount exceeds the difference between the amount of 10.314 cents, delivered to the payment account in the previous crediting operations, and the total amount of expenses of this payment account, which makes 6732.8 cents, the payer combines the payment operation with the operation of crediting a payment account.

The payer order PayerOrder consists of the identifier of the public key of the payment certificate, which coincides in the present example with the value on the key EP of the hash function H fixed in advance, the signature $S_1$ of the payment certificate, the seller's account number Account/d, and the data C, defining the conditions of payment. In the present example, the payer takes as C the seller's account number AccountId and the value of the hash function H on the text of the seller's obligation valid in the case of a payment, namely, an obligation to supply the corresponding goods to the person with the indicated identification data.

The identifier H(EP) of the public key of the payment certificate included in the payer order PayerOrder is used in the payment server for search of the payment account connected with the key EP. The signature $S_1$ of the payment certificate included in the payer order PayerOrder is used in the payment server for crediting the payment account with public key EP.

The signature $S_1$ is made in the payer device from the signature S of the payment certificate. Here, the level L= $(L_1, \ldots, L_3)$ of the signature $S_1$ is chosen so that, first, the value corresponding to this level suffices for performing the present payment operation considering the expenses paid earlier, secondly, that said level does not exceed the level of the signature S in each of the three orders, and, thirdly, that in each of the three orders the said level would not be less than the level of the signature delivered to the operator in one of the previous operations of crediting the payment account, i.e., in the present example, not less than the level (1, 3, 14). In the present example, one takes L=(2, 7, 15). The signature $S_1$ is made with the help of a computing device programmed in the corresponding way, in accordance with the relation $S_1 = S^V \pmod{N}$, where $V = V_1 \cdot V_2 \cdot V_3$, $V_1 = E_1^{M1-L_1}$, $V_2 = E_2^{M2-L_2}$, $V_3 = E_3^{M3-L_3}$, and the level $(M_1, \ldots, M_3)$ is equal to the level (2,12,45), i.e., to the level of the signature S.

The seller willing to accept the payment forms the payee order SellerOrder=(AccountId, PayerOrder) encrypted with the bank's public encryption key and delivers it to the bank.

The bank, having detected a record of a payment account with public key EP in the payment account database and having verified the validity of the signature $S_1$ with the help of a public or a secret money key, increases the total amount on the found account to the amount corresponding to the level each order of which equals the maximal one of the corresponding orders of the levels of all signatures of the payment certificates delivered to the bank in the operations of crediting the given payment account. After that, the payment operation per se is performed. This operation is performed as in the above example of the first payment operation.

Below, a description of a payment operation performed with the help of an already opened payment account without combining it with the operation of crediting a payment account is given. Generally speaking, the payee participating in this operation is in no way connected with the payee from the first payment operation described above.

Such an operation is performed in the case where the payment amount does not exceed the difference between the amount delivered to the payment account in previous crediting operations and the total amount of expenses of this payment account. In such an operation, the payer order PayerOrder does not contain the payment certificate signature, but consists of the identifier of the public key of the payment certificate, which identifier coincides in the present example with the value on the key EP of the hash function H fixed in advance, the seller's account number AccountId, and the data C determining the conditions of payment. In the present example, the payer takes as C the seller's account number AccountId and the value of the hash function H on the text of the seller's obligation valid in the case of a payment, namely, an obligation to supply the corresponding goods to the person with the indicated identification data. In all other respects, such an operation proceeds in the same way as the payment operations described above.

A description of the best embodiment of the method for effecting payments by the fourth variant is given below.

In the best embodiment of the method for effecting payments by the fourth variant, one performs all actions that are performed in the best embodiment of the method for effecting payments by the third variant. In addition, one additionally performs an operation of replenishing the payment certificate, and the best embodiment of this operation is described above in the description of the best embodiment of the method for effecting payments by the second variant.

The possibility of realization of the above-described best embodiment of the method for effecting payments by the fourth variant is clarified by the above-described Example 4, where the possibility of realization of the best embodiment of the method for effecting payments by the third variant is clarified, and by the above-described Example 3, where the possibility of realization of the best embodiment of replenishing the payer device with the help of replenishing payment certificate is clarified.

A description of the best embodiment of the apparatus for effecting payments is given below.

In the best embodiment, the payer device contains a means for replenishing the payer device by the use of making a blind money signature of an operator, which is realized by a means for increasing the level of the payment certificate signature. In addition, the payer device contains a means for opening a public key account. Furthermore, the means for forming a payer order signed with the secret key of the payment certificate has a means for forming a demand for crediting the payment account, which, in turn, has a means for decreasing the level of the payment certificate signature.

The payee device contains a means for opening a public key account and a means for verifying the signed payee receipt with the operator's public key.

The payment server contains a means for serving a database of payment accounts and a means for serving a database of accounts, and the means for serving a database of accounts has a means for opening a public key account, a means for crediting an account and a means for debiting an account. The means for serving a database of payment accounts has a means for opening a payment account, a means for verifying the money signature and a means for crediting a payment account. The means for performing a payment operation contained in the payment server has a means for verifying a signature on the payer order and a means for making a signed payee receipt. In addition, the payment server contains a means for making a signed payee receipt.

The means for storing information in the storage devices of the payer device, of the payee device, and of the payment server have high reliability, and the payer device, the payee device, and the payment server are equipped with means for encryption of outgoing messages and means for decryption of incoming messages.

The possibility of realization of the above-described best embodiment of the apparatus for effecting payments and using such a system are clarified by the following example.

EXAMPLE 5

Figure 2:
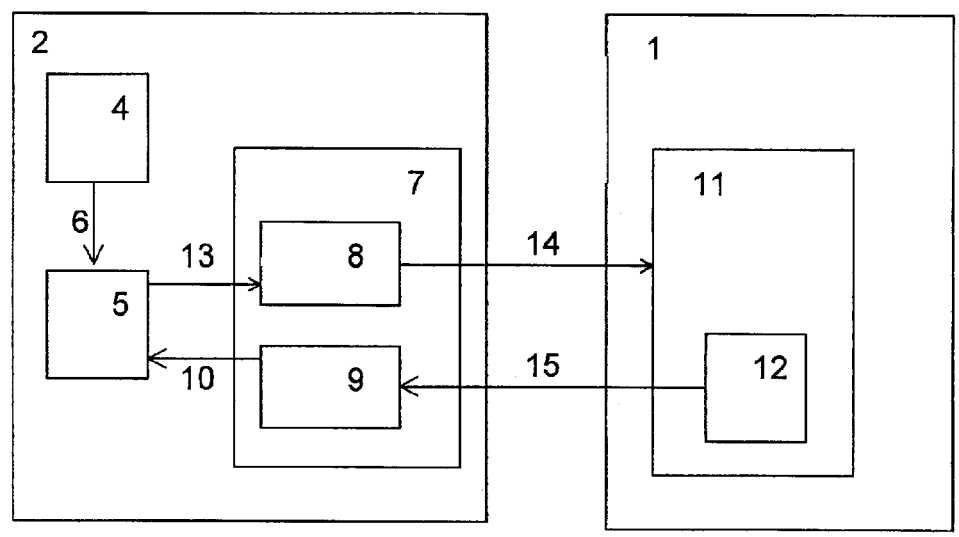
FIG. 2 shows a flow-chart of the operation of replenishing the payer device.
Figure 3:
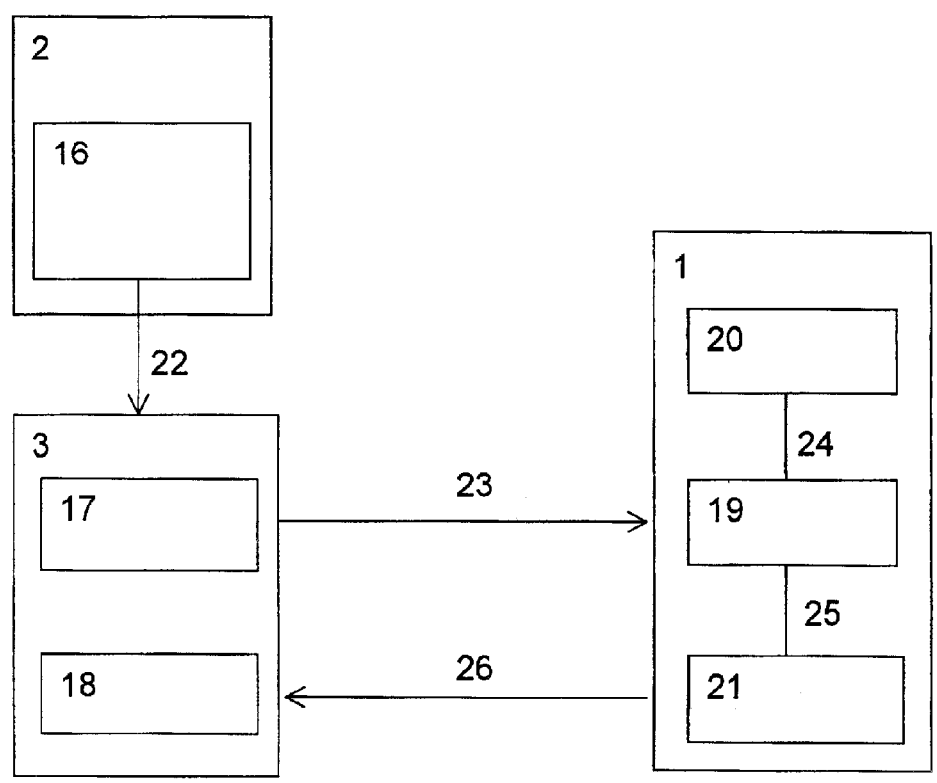
FIG. 3 shows a flow-chart of the payment operation.

The example is illustrated by FIG. 1, FIG. 2, and FIG. 3. FIG. 1 shows a flow-chart of the apparatus for effecting payments containing payment server 1, payer device 2, and payee device 3. Here, the lines drawn between the blocks show interconnections between the above-mentioned devices via telecommunication nets.

FIG. 2 shows a flow-chart of an operation of replinishing a payer device. Here, block 4 shows a means for creating a payment certificate base by processing the public key of a payment certificate with a one-way function, block 5 shows a storage device, line 6 shows a means for storing the created payment certificate base in the storage device, block 7 shows a means for increasing the level of the payment certificate signature, block 8 shows a means for forming a money demand including a blinded payment certificate signature, block 9 shows a means for unblinding the data to be unblinded comprised in a response to the money demand, line 10 shows a means for entering the result of unblinding into the storage device, block 11 shows a means for processing the money demand, and block 12 shows a means for making a money signature. In addition, line 13 shows a means for reading the payment certificate signature from the storage device, line 14 shows a connection via which the money demand is delivered to the payment server, and line 15 shows a connection via which the operator's i response to the money demand is delivered to the payer device.

FIG. 3 shows a flow-chart of a payment operation. Here, block 16 shows a means for forming a payer order signed with the secret key of a payment certificate, block 17 shows a means for forming a payee order including a payer order, block 18 shows a means for verifying a signed payee receipt, block 19 shows a means for performing a payment operation, block 20 shows a payment account database, block 21 shows an account database. In addition, line 22 shows a connection via which a payer order is delivered to the payee device, line 23 shows a connection via which a payee order is delivered to the payment server, line 24 shows interaction between the means for performing a payment operation and the payment account database, line 25 shows interaction between the means for performing a payment operation and the account database, and line 26 shows a connection via which the operator's response to a payee order is delivered to the payee device.

The apparatus for effecting payments is realized by programming means on the basis of the algorithms indicated in Examples 2 and 3 above. In particular, cryptographic means used, such as making a signature, verification of a signature, encryption, and decryption, are based on the functions of arithmetic of integral numbers and modular arithmetic. Examples of realization of such functions are well known in the art. Means for calculating hash functions utilized are also well known.

With the help of the apparatus for effecting payments, which is shown in FIG. 1, payments are effected as follows.

Payer device 2 is replenished for an arbitrary number of times. Here, one can replenish the payer device with the help of both primarily filling a payment certificate and replenishing one of the payment certificates already at hand. When replenishing the payer device with the help of primarily filling a payment certificate, one uses the means for creating a payment certificate base, in which the public key of the payment certificate is processed by a one-way function, after which the created payment certificate base is entered via line 6 into storage device 5, both as the base of the payment certificate and as the payment certificate signature of zero level.

In an arbitrary operation of replenishing payer device 2, a payment certificate signature is entered via line 13 into block 7, where the payment certificate signature is blinded and a money demand including the blinded payment certificate signature is formed with the help of block 8. The money demand is delivered via line 14 to payment server 1, where it is processed in block 11, including making a money signature on the blinded payment certificate signature with the help of block 12. The operator's response to the money demand, which response is formed in block 11, is entered via line 15 into payer device 2, where the data to be unblinded contained in the response to the money demand is unblinded with the help of block 9. Unblinded data are entered via line 10 into storage device 6 as the payment certificate signature of higher level.

When performing a payment operation, a payer order signed with the secret key of the payment certificate is formed in block 16 of payer device 2. The payer order is entered via line 22 into payee device 3, where a payee order including the payer order is formed in block 17. The payee order is entered via line 23 into payment server 1, where with the help of block 19 one performs a payment operation, in the course of which the payee's account stored in account database 21 is credited from the funds of the payment account stored in payment account database 20. Here, reading and modification of records of the payment account and the payee's account are performed via lines 24 and 25, respectively. The operator's response to the payee order formed in block 19 and including a payee receipt signed with the operator's secret key is entered via line 26 into block 18 of payee device 3, where the signed payee receipt is verified, which completes the payment operation.

VARIANTS OF IMPLEMENTING THE INVENTION

For each of the variants of the claimed method for effecting payments, the invention admits an embodiment such that the payer device can be replenished from the funds of an intermediate payer. In this case, when replenishing his payer device, the payer delivers the blinded data to an intermediate payer, who additionally blinds said blinded data and, correspondingly, unblinds the data to be unblinded which he receives it from the bank.

If need be, the payee can also control the incoming payments. Such control is intended in order to ensure that nobody can credit the payee's account without his assistance. To exercise such control, the payee order and its signature with the payee's secret key are delivered to the payment server, and during the performing of a payment operation the validity of the signature on the payee order is verified. Furthermore, when forming the payer and payee orders, the conditions of payment are included in these orders, and during the execution of a payment operation the correspondence between the conditions of payment contained in the payer and payee orders is controlled in the payment server. In particular, in the payer device when forming the payment data and in the payee device when forming the payee order, one processes the payee obligation data with the help of one and the same one-way function, and the data obtained by the processing are included both in the payment data and in the payee order as a part of the conditions of payment.

The reliability of the method for effecting payments by each of the variants is ensured, in particular, by that if there are malfunctions in communication nets when performing the operations employed in a payment, such operations can be recovered till their successful completion without damage for the parties involved.

As the replenishment source in the operation of replenishing the payer device, one can use the payer's account, which was credited in advance when performing an earlier payment operation, in which the payer, in turn, played a role of the payee.

When performing a payment operation, the payee can playa role of a payer. Such a payment operation can be used for transferring values from the payer device to the payer's account.

An overgrowth of the operator's databases storing information on payment certificates can be prevented by charging either the operation of replenishing the payer device or the operation of opening the payment account connected with a payment certificate.

The operator's money obligations associated with payment certificates can be expressed in various currencies, and performing both a payment operation and an operation of replenishing the payer devic can be combined with the operation of converting one currency into another.

To increase the security of the participants of a payment system utilizing the present invention, one can introduce certain restrictions both on the amount of a single replenishment of the payer device, and on the total amount of expenses of the replenishment source within a certain period of time.

The message exchange between the payee device and the payment server, the payer device and the payment server, and the payee device and the payer device can proceed in the interactive mode. In particular, the money demand, the payment data, the payee order, and other data can be delivered to their addressee in portions.

The procedure of acknowledging by the payment system operator of his obligations associated with a payment certificate, besides the verification of the operator's own signature of the certificate, can include verification of the validity period of other data, as well.

In addition, the data to be unblinded, which one received when replenishing the payer device, together with data allowing one to perform such an unblinding can be used as the payment certificate signature, because they allow one to convince a third party in the existence of the operator's obligations.

INDUSTRIAL APPLICABILITY

The invention can be used in electronic queueing systems, especially those where payments via open communication nets are required. Among possible applications, the invention can be used for organizing payment systems, trade systems, service centers, and in many other areas. In particular, the invention can be used in the work of banks and systems of banks, for organizing shops, trade in securities, lotteries, etc.

What is claimed is:

1. A method for effecting payments comprising steps of: replenishing a payer device by an operation of primarily filling a payment certificate, in which a payment certificate base is created in the payer device and a payment certificate signature is obtained by means of making a blind money signature of an operator; performing an operation of opening a payees account; performing a payment operation in which the payment certificate signature and an identifier of the payment certificate base are included into payment data delivered to a payee device by means of which a payee order is formed including the payment certificate signature and the identifier of the payment certificate base; delivering the formed payee order to a payment server in which the payee's account is credited on the basis of the payee order in the case of absence of an information that the payment certificate was utilized, according to the validity of the delivered payment certificate signature; and forming the operator's response to the payee order, by means of which response the payment operation is judged, characterized in that the method is further comprising steps of: including an identifier of a public key into the payment certificate base, said public key corresponding to an arbitrary secret key of a payer, wherein the public key is accepted as the public key of the payment certificate and the secret key of the payer is accepted as a secret key of the payment certificate; including a payer order signed with the secret key of the payment certificate into the payment data, and including an information on the payee and the identifier of the payment certificate base into the payer order; and the step of crediting the payee's account is carried out according to the validity of the signature on the payer order.

2. The method according to claim 1, characterized in that in the step of performing the payment operation the signed payer order is entered into the operator's information storage.

3. The method according to claim 1, characterized in that in the step of replenishing the payer device a money demand is formed including data for making a blind money signature, and is delivered to the payment server in which a replenishment source and replenishment amount are determined according to the money demand; data to be unblinded are created in the step of making the blind money signature by processing data for making the blind money signature, that are comprised in the demand, with a secret money key corresponding to the replenishment amount, whereupon the payment certificate signature is made in the payer device by unblinding.

4. The method according to claim 3, characterized in that in the step of replenishing the payer device by the operation of primarily filling the payment certificate a blinded identifier of the created payment certificate base is included as the data for making the blind money signature into the money demand being formed.

5. The method according to claim 1, characterized in that in the step of performing the payment operation a payee receipt is included into the operator's response to the payee order, which receipt being signed with an arbitrary secret key of the operator, and the performing of the payment for the payee is judged according to the validity of the signature on the payee receipt.

6. The method according to claim 1, characterized in that in the step of performing the payment operation data are formed in the payee device with the use of the operator's response to the payee order and delivered to the payer device, according to which data the performing of the payment for the payer is judged.

7. The method according to claim 6, characterized in that in the step of performing the payment operation a payer receipt is included into the operator's response to the payee order and into the data delivered to the payer device, which receipt being signed with an arbitrary secret key of the operator, and the performing of the payment for the payer is judged according to the validity of the signature on the payer receipt.

8. The method according to claim 7, characterized in that the payer receipt is encrypted by an arbitrary encryption key of the payer prior to including said receipt into the operator's response to the payee order.

9. The method according to claim 1, characterized in that in performing operations with the payment certificate the public key of the payment certificate converted by an arbitrary one-way function is used as the identifier of the payment certificate base.

10. The method according to claim 1, characterized in that in performing operations with the payment certificate the public key of the payment certificate is used as the identifier of the public key of the payment certificate.

11. The method according to claim 1, characterized in that in the step of replenishing the payer device the validity of the made payment certificate signature is verified.

12. The method according to claim 1, characterized in that in the step of opening the account an arbitrary secret key is accepted as the secret key of the account, and the public key corresponding to the secret key of the account is delivered to the payment server as the public key of the account being opened.

13. The method according to claim 1, characterized in that conditions of payment are included into the payer order.

14. The method according to claim 13, characterized in that payee obligation data are included into the conditions of payment comprised in the payer order.

15. The method according to claim 14, characterized in that prior to performing the payment operation, the payee obligation data are signed with an arbitrary secret key of the payee, and the payer verifies the payee's signature on the payee obligation data prior to performing the payment operation.

16. The method according to claim 13, characterized in that in the payer device in the step of forming the payment data, the payee obligation data are processed by an arbitrary one-way function, and data obtained in this processing are included into the payer order as the conditions of payment.

17. The method according to claim 1, characterized in that the payer order is encrypted by an arbitrary public encryption key of the operator prior to including them into the payment data.

18. The method according to claim 3, characterized in that in the step of replenishing the payer device the payer's account is used as the replenishment source.

19. The method according to claim 3, characterized in that in the step of replenishing the payer device a bank card is used as the replenishment source.

20. The method according to claim 1, characterized in that in the step of performing the payment operation the payee appears as the payer.

21. The method according to claim 1, characterized in that in the step of performing the payment operation a part of a payment certificate value is returned to the payer device.

22. The method according to claim 1, characterized in that the step of replenishing the payer device is performed from funds of an intermediate payer.

23. The method according to claim 22, characterized in that in the step of replenishing the payer device, the data blinded in the payer device in the step of making the blind money sig nature of the operator are subjected to an additional blinding in the payer device of the intermediate payer.

24. A method for effecting payments comprising steps of: replenishing a payer device by an operation of primarily filling a payment certificate, in which a payment certificate base is created in the payer device and a payment certificate signature is obtained by means of making a blind money signature of an operator; performing an operation of opening a payee's account; performing a payment operation in which the payment certificate signature and an identifier of the payment certificate base are included into payment data delivered to a payee device by means of which a payee order is formed including the payment certificate signature and the identifier of the payment certificate base; delivering the formed payee order to a payment server in which the payee's account is credited on the basis of the payee order in the case of absence of an information that the payment certificate was utilized, according to the validity of the delivered payment certificate signature; and forming the operator's response to the payee order, by means of which response the payment operation is judged, characterized in that the method is further comprising steps of: including an identifier of a public key into the payment certificate base, said public key corresponding to an arbitrary secret key of a payer, wherein the public key is accepted as the public key of the payment certificate and the secret key of the payer is accepted as the secret key of the payment certificate; replenishing the payer device by means of an operation of replenishing the payment certificate, in which operation a blind money signature of the operator on the payment certificate signature already being in the payer device is made; including a payer order signed with the secret key of the payment certificate into the payment data, and including an information on the payee and the identifier of the payment certificate base into the payer order; and the step of crediting the payee's account is carried out according to the validity of the signature on the payer order.

25. The method according to claim 24, characterized in that in the step of replenishing the payer device a money demand is formed including data for making a blind money signature, and is delivered to the payment server in which a replenishment source and replenishment amount are determined according to the money demand; data to be unblinded are created in the step of making the blind money signature by processing data for making the blind money signature, that are comprised in the demand, with a secret money key corresponding to the replenishment amount, whereupon the payment certificate signature is made in the payer device by unblinding.

26. The method according to claim 25, characterized in that in the step of replenishing the payer device by the operation of primarily filling the payment certificate a blinded identifier of the created payment certificate base is included as the data for making the blind money signature into the money demand being formed.

27. The method according to claim 25, characterized in that in the step of replenishing the payer device by the operation of replenishing the payment certificate a blinded payment certificate signature is included as the data for making the blind money signature into the money demand being formed.

28. The method according to claim 24, characterized in that in the step of performing the payment operation the signed payer order is entered into the operator's information storage.

29. The method according to claim 24, characterized in that in the step of performing the payment operation a payee receipt is included into the operator's response to the payee order, which receipt bing signed with an arbitrary secret key of the operator, and the performing of the payment for the payee is judged according to the validity of the signature on the payee receipt.

30. The method according to claim 24, characterized in that in the step of performing the payment operation data are formed in the payee device with the use of the operator's response to the payee order and delivered to the payer device, according to which data the performing of the payment for the payer is judged.

31. The method according to claim 30, characterized in that in the step of performing the payment operation a payer receipt is included into the operator's response to the payee order and into the data delivered to the payer device, which receipt being signed with an arbitrary secret key of the operator, and the performing of the payment for the payer is judged according to the validity of the signature on the payer receipt.

32. The method according to claim 31, characterized in that the payer receipt is encrypted by an arbitrary encryption key of the payer prior to including said receipt into the operator's response to the payee order.

33. The method according to claim 24, characterized in that in performing operations with the payment certificate the public key of the payment certificate converted by an arbitrary one-way function is used as the identifier of the payment certificate base.

34. The method according to claim 24, characterized in that in performing operations with the payment certificate the public key of the payment certificate is used as the identifier of the public key of the payment certificate.

35. The method according to claim 24, characterized in that in the step of replenishing the payer device the validity of the made payment certificate signature is verified.

36. The method according to claim 24, characterized in that in the step of opening the account an arbitrary secret key is accepted as the secret key of the account, and the public key corresponding to the secret key of the account is delivered to the payment server as the public key of the account being opened.

37. The method according to claim 24, characterized in that conditions of payment are included into the payer order.

38. The method according to claim 37, characterized in that payee obligation data are included into the conditions of payment comprised in the payer order.

39. The method according to claim 38, characterized in that prior to performing the payment operation, the payee obligation data are signed with an arbitrary secret key of the payee, and the payer verifies the payee's signature on the payee obligation data prior to performing the payment operation.

40. The method according to claim 38, characterized in that in the payer device in the step of forming the payment data, the payee obligation data are processed by an arbitrary one-way function, and data obtained in this processing are included into the payer order as the conditions of payment.

41. The method according to claim 24, characterized in that the payer order is encrypted by an arbitrary public encryption key of the operator prior to including them into the payment data.

42. The method according to claim 25, characterized in that in the step of replenishing the payer device a payer's account is used as the replenishment source.

43. The method according to claim 25, characterized in that in the step of replenishing the payer device a bank card is used as the replenishment source.

44. The method according to claim 24, characterized in that in the step of performing the payment operation the payee appears as the payer.

45. The method according to claim 24, characterized in that in the step of performing the payment operation a part of a payment certificate value is returned to the payer device.

46. The method according to claim 24, characterized in that the step of replenishing the payer device is performed from funds of an intermediate payer.

47. The method according to claim 46, characterized in that in the step of replenishing the payer device, data blinded in the payer device in the step of making the blind money signature of the operator are subjected to an additional blinding in the payer device of the intermediate payer.

48. A method for effecting payments comprising steps of: replenishing a payer device by an operation of primarily filling a payment certificate, in which a payment certificate base is created in the payer device and a payment certificate signature is obtained by means of making a blind money signature of an operator; performing an operation of opening a payee's account; performing a payment operation in which an identifier of the payment certificate base is included into payment data delivered to a payee device by means of which a payee order is formed including the identifier of the payment certificate base received from a payer; delivering the formed payee order to a payment server in which the payee's account is credited on the basis of the payee order; forming the operator's response to the payee order, by means of which response the payment operation is judged, characterized in that the method is further comprising steps of: including an identifier of a public key into the payment certificate base, said public key corresponding to an arbitrary secret key of the payer, wherein the public key is accepted as the public key of the payment certificate and the secret key of the payer is accepted as the secret key of the payment certificate; opening a payment account associated with the payment certificate base; carrying out an operation of crediting the payment account, in which a payment certificate signature is delivered to the payment server, choosing the level of said signature arbitrarily within the level of the payment certificate, and the operation of crediting the payment account is carried out in accordance with the excess of the level of the delivered signature above the level of the payment account; including a payer order signed with the secret key of the payment certificate into the payment data, and including an information on the payee and the identifier of the payment certificate base into the payer order; and the step of crediting the payee's account is carried out according to the validity of the signature on the payer order from funds of the payment account.

49. The method according to claim 48, characterized in that the payment account associated with the payment certificate base is opened in the step of performing the payment operation.

50. The method according to claim 48, characterized in that the operation of crediting the payment account is carried out in the step of performing the payment operation.

51. The method according to claim 48, characterized in that in the step of performing the payment operation the signed payer order is entered into the operator's information storage.

52. The method according to claim 48, characterized in that in the step of replenishing the payer device a money demand is formed including data for making a blind money signature, and is delivered to the payment server in which a replenishment source and replenishment amount are determined according to the money demand; data to be unblinded are created in the step of making the blind money signature by processing data for making the blind money signature, that are comprised in the demand, with a secret money key corresponding to the replenishment amount, whereupon the payment certificate signature is made in the payer device by unblinding.

53. The method according to claim 52, characterized in that in the step of replenishing the payer device by the operation of primarily filling the payment certificate a blinded identifier of the created payment certificate base is included as the data for making the blind money signature into the money demand being formed.

54. The method according to claim 48, characterized in that in the step of performing the payment operation a payee receipt is included into the operator's response to the payee order, which receipt being signed with the arbitrary secret key of the operator, and the performing of the payment for the payee is judged according to the validity of the signature on the payee receipt.

55. The method according to claim 48, characterized in that in the step of performing the payment operation data are formed in the payee device with the use of the operator's response to the payee order and delivered to the payer device, according to which data the performing of the payment for the payer is judged.

56. The method according to claim 55, characterized in that in the step of performing the payment operation a payer receipt is included into the operator's response to the payee order and into the data delivered to the payer device, which receipt being signed with the arbitrary secret key of the operator, and the performing of the payment for the payer is judged according to the validity of the signature on the payer receipt.

57. The method according to claim 56, characterized in that the payer receipt is encrypted by an arbitrary encryption key of the payer prior to including said receipt into the operator's response to the payee order.

58. The method according to claim 48, characterized in that in performing operations with the payment certificate the public key of the payment certificate converted by an arbitrary one-way function is used as the identifier of the payment certificate base.

59. The method according to claim 48, characterized in that in performing operations with the payment certificate the public key of the payment certificate is used as the identifier of the public key of the payment certificate.

60. The method according to claim 48, characterized in that in the step of replenishing the payer device the validity of the made payment certificate signature is verified.

61. The method according to claim 48, characterized in that in the step of opening the account an arbitrary secret key is accepted as the secret key of the account, and the public key corresponding to the secret key of the account is delivered to the payment server as the public key of the account being opened.

62. The method according to claim 48, characterized in that conditions of payment are included into the payer order.

63. The method according to claim 62, characterized in that payee obligation data are included into the conditions of payment comprised in the payer order.

64. The method according to claim 63, characterized in that prior to performing the payment operation, the payee obligation data are signed with an arbitrary secret key of the payee, and the payer verifies the payee's signature on the payee obligation data prior to performing the payment operation.

65. The method according to claim 63, characterized in that in the payer device in the step of forming the payment data, the payee obligation data are processed by an arbitrary one-way function, and data obtained in this processing are included into the payer order as the conditions of payment.

66. The method according to claim 48, characterized in that the payer order is encrypted by an arbitrary public encryption key of the operator prior to including them into the payment data.

67. The method according to claim 52, characterized in that in the step of replenishing the payer device the payer's account is used as the replenishment source.

68. The method according to claim 52, characterized in that in the step of replenishing the payer device a bank card is used as the replenishment source.

69. The method according to claim 48, characterized in that in the step of performing the payment operation the payee appears as the payer.

70. The method according to claim 48, characterized in that in the step of performing the payment operation a part of a payment certificate value is returned to the payer device.

71. The method according to claim 52, characterized in that in the step of replenishing the payer device, the payment account associated with the base of one of payment certificates is used as the replenishment source.

72. The method according to claim 48, characterized in that the step of replenishing the payer device is performed from funds of an intermediate payer.

73. The method according to claim 72, characterized in that in the step of replenishing the payer device, data blinded in the payer device in the step of making the blind money signature of the operator are subjected to an additional blinding in the payer device of the intermediate payer.

74. A method for effecting payments comprising steps of: replenishing a payer device by an operation of primarily filling a payment certificate, in which a payment certificate base is created in the payer device and a payment certificate signature is obtained by means of making a blind money signature of an operator; performing an operation of opening a payee's account; performing a payment operation in which an identifier of the payment certificate base is included into payment data delivered to a payee device by means of which a payee order is formed including the identifier of the payment certificate base received from a payer; delivering the formed payee order to a payment server in which the payee's account is credited on the basis of the payee order; forming the operator's response to the payee order, by means of which response the payment operation is judged, characterized in that the method is further comprising steps of: including an identifier of a public key into the payment certificate base, said public key corresponding to an arbitrary secret key of the payer, wherein the public key is accepted as the public key of the payment certificate and the secret key of the payer is accepted as the secret key of the payment certificate; replenishing the payer device by means of an operation of replenishing the payment certificate, in which a blind money signature of the operator on the payment certificate signature already being in the payer device is made; opening a payment account associated with the payment certificate base; carrying out an operation of crediting the payment account, in which a payment certificate signature is delivered to the payment server, choosing the level of said signature arbitrarily within the level of the payment certificate, and the operation of crediting the payment account is carried out in accordance with the excess of the level of the delivered signature above the level of the payment account; including a payer order signed with the secret key of the payment certificate into the payment data, and including an information on the payee and the identifier of the payment certificate base into the payer order; and the step of crediting the payee's account is carried out according to the validity of the signature on the payer order from funds of the payment account.

75. The method according to claim 74, characterized in that the payment account associated with the payment certificate base is opened in the step of performing the payment operation.

76. The method according to claim 74, characterized in that the operation of crediting the payment account is carried out in the step of performing the payment operation.

77. The method according to claim 74, characterized in that in the step of performing the payment operation the signed payer order is entered into the operator's information storage.

78. The method according to claim 74, characterized in that in the step of replenishing the payer device a money demand is formed including data for making a blind money signature, and is delivered to the payment server in which a replenishment source and replenishment amount are determined according to the money demand; data to be unblinded are created in the step of making the blind money signature by processing data for making the blind money signature, that are comprised in the demand, with a secret money key corresponding to the replenishment amount, whereupon the payment certificate signature is made in the payer device by unblinding.

79. The method according to claim 78, characterized in that in the step of replenishing the payer device by the operation of primarily filling the payment certificate a blinded identifier of the created payment certificate base is included as the data for making the blind money signature into the money demand being formed.

80. The method according to claim 78, characterized in that in the step of replenishing the payer device by the operation of replenishing the payment certificate a blinded payment certificate signature is included as the data for making the blind money signature into the money demand being formed.

81. The method according to claim 74, characterized in that in the step of performing the payment operation a payee receipt is included into the operator's response to the payee order, which receipt being signed with the arbitrary secret key of the operator, and the performing of the payment for the payee is judged according to the validity of the signature on the payee receipt.

82. The method according to claim 74, characterized in that in the step of performing the payment operation data are formed in the payee device with the use of the operator's response to the payee order and delivered to the payer device, according to which data the performing of the payment for the payer is judged.

83. The method according to claim 82, characterized in that in the step of performing the payment operation a payer receipt is included into the operator's response to the payee order and into the data delivered to the payer device, which receipt being signed with the arbitrary secret key of the operator, and the performing of the payment for the payer is judged according to the validity of the signature on the payer receipt.

84. The method according to claim 83, characterized in that the payer receipt is encrypted by an arbitrary encryption key of the payer prior to including said receipt into the operator's response to the payee order.

85. The method according to claim 74, characterized in that in performing operations with the payment certificate the public key of the payment certificate converted by an arbitrary one-way function is used as the identifier of the payment certificate base.

86. The method according to claim 74, characterized in that in performing operations with the, payment certificate the public key of the payment certificate is used as the identifier of the public key of the payment certificate.

87. The method according to claim 74, characterized in that in the step of replenishing the payer device the validity of the made payment certificate signature is verified.

88. The method according to claim 74, characterized in that in the step of opening the account an arbitrary secret key is accepted as the secret key of the account, and the public key corresponding to the secret key of the account is delivered to the payment server as the public key of the account being opened.

89. The method according to claim 74, characterized in that conditions of payment are included into the payer order.

90. The method according to claim 89, characterized in that payee obligation data are included into the conditions of payment comprised in the payer order.

91. The method according to claim 90, characterized in that prior to performing the payment operation, the payee obligation data are signed with an arbitrary secret key of the payee, and the payer verifies the payee's signature on the payee obligation data prior to performing the payment operation.

92. The method according to claim 90, characterized in that the payer device in the step of forming the payment data, the payee obligation data are processed by an arbitrary one-way function, and data obtained in this processing are included into the payer order as the conditions of payment.

93. The method according to claim 74, characterized in that the payer order is encrypted by an arbitrary public encryption key of the operator prior to including them into the payment data.

94. The method according to claim 78, characterized in that in the step of replenishing the payer device a payer's account is used as the replenishment source.

95. The method according to claim 78, characterized in that in the step of replenishing the payer device a bank card is used as the replenishment source.

96. The method according to claim 74, characterized in that in the step of performing the payment operation the payee appears as the payer.

97. The method according to claim 74, characterized in that in the step of performing the payment operation a part of a payment certificate value is returned to the payer device.

98. The method according to claim 78, characterized in that in the step of replenishing the payer device, the payment account associated with the base of one of payment certificates is used as the replenishment source.

99. The method according to claim 74, characterized in that the step of replenishing the payer device is performed from funds of an intermediate payer.

100. The method according to claim 99, characterized in that in the step of replenishing the payer device, data blinded in the payer device in the step of making the blind money signature of the operator are subjected to an additional blinding in the payer device of the intermediate payer.

101. An apparatus for effecting payments comprising a payer device, payee device and payment server interconnected by telecommunication nets, the payer device comprising a means for replenishing the payer device by the use of making a blind money signature of an operator, and the payment server comprising a means for making a money signature, characterized in that the payer device further comprises a means for creating a payment certificate base by processing a public key of the payment certificate with a one-way function, a means for storing the created payment certificate base in a storage device, and a means for forming a payer order signed with a secret key of the payment certificate; the payee device comprises a means for forming a payee order including the payer order; the payment server further comprises a means for performing a payment operation, a means for serving a database of payment accounts, and a means for serving a database of accounts, wherein said means for performing a payment operation has a means for verifying a signature on the payer order and a means for making a signed payee receipt, said means for serving the database of payment accounts has a means for verifying the money signature, and the means for replenishing the payer device by the use of making the blind money signature of the operator is realized using a means for increasing the level of a payment certificate signature.

102. The apparatus according to claim 101, characterized in that the payee device comprises a means for opening a public key account, and said means for serving the database of accounts has a means for opening a public key account.

103. The apparatus according to claim 101, characterized in that the payer device comprises a means for opening a public key account, and said means for serving the database of accounts has a means for opening a public key account.

104. The apparatus according to claim 101, characterized in that said means for increasing the level of the payment certificate signature has a means for forming a money demand including a blinded payment certificate signature, a means for unbinding the data to be unblinded comprised in a response to the money demand, and a means for entering the result of unblinding into said storage device, and the payment server comprises a means for processing the money demand, wherein said means for processing the money demand has a means for making the money signature.

105. The apparatus according to claim 101, characterized in that said means for serving the database of payment accounts has a means for opening a payment account and a means for crediting a payment account.

106. The apparatus according to claim 101, characterized in that the payee device has a means for verifying the signed payee receipt.

107. The apparatus according to claim 101, characterized in that said means for forming the payer order signed with the secret key of the payment certificate has a means for forming a demand for crediting the payment account.

108. The apparatus according to claim 107, characterized in that said means for forming the demand for crediting the payment account has a means for decreasing the level of the payment certificate signature.

109. The apparatus according to claim 101, characterized in that the payer device, payee device and payment server are further provided with a means for encryption of outgoing messages and a means for decryption of incoming messages.

* * * * *